United States Patent

Haas et al.

[11] Patent Number: 5,808,655
[45] Date of Patent: Sep. 15, 1998

[54] INTERLEAVING THERMAL PRINTING WITH DISCONTIGUOUS DYE-TRANSFER TRACKS ON AN INDIVIDUAL MULTIPLE-SOURCE PRINTHEAD PASS

[75] Inventors: Daniel D. Haas, Webster; Thomas A. Mackin, Hamlin; Kurt M. Sanger, Rochester; Sanwal P. Sarraf, Pittsford, all of N.Y.

[73] Assignee: Eastman Kodak Company, Rochester, N.Y.

[21] Appl. No.: 439,746

[22] Filed: May 12, 1995

[51] Int. Cl.⁶ .................. B41J 2/47; B41J 2/435; B41J 2/35
[52] U.S. Cl. .................................... 347/234; 347/211
[58] Field of Search .................. 347/232, 233, 347/234, 237, 240, 211; 358/296; 359/198; 395/108, 109

[56] References Cited

U.S. PATENT DOCUMENTS

| | | |
|---|---|---|
| 3,701,998 | 10/1972 | Mathis . |
| 4,009,332 | 2/1977 | Van Hook . |
| 4,063,254 | 12/1977 | Fox et al. . |
| 4,069,486 | 1/1978 | Fox . |
| 4,112,469 | 9/1978 | Paranjpe et al. ............ 358/296 |
| 4,232,324 | 11/1980 | Tsao . |
| 4,320,406 | 3/1982 | Heinzl . |
| 4,540,996 | 9/1985 | Saito . |
| 4,635,075 | 1/1987 | Grummer et al. . |
| 4,804,975 | 2/1989 | Yip . |
| 4,885,752 | 12/1989 | Chien et al. . |
| 4,900,130 | 2/1990 | Haas . |
| 4,905,025 | 2/1990 | Sakamoto et al. . |
| 4,908,632 | 3/1990 | Ishikawa et al. . |
| 4,953,995 | 9/1990 | Sims et al. . |
| 4,978,971 | 12/1990 | Goetz et al. . |
| 4,999,646 | 3/1991 | Trask . |
| 5,015,066 | 5/1991 | Cressman . |
| 5,109,476 | 4/1992 | Thompson . |
| 5,119,108 | 6/1992 | Hatakeyama . |
| 5,153,605 | 10/1992 | Ohara et al. . |
| 5,153,606 | 10/1992 | Bas . |
| 5,164,742 | 11/1992 | Baek et al. . |
| 5,167,456 | 12/1992 | Murakoshi et al. . |
| 5,168,288 | 12/1992 | Baek et al. . |
| 5,191,356 | 3/1993 | Shibamiya . |
| 5,234,890 | 8/1993 | Burberry et al. . |
| 5,234,891 | 8/1993 | Burberry et al. . |
| 5,240,900 | 8/1993 | Burberry . |
| 5,241,328 | 8/1993 | Sarraf et al. . |
| 5,247,314 | 9/1993 | Stephenson . |
| 5,247,315 | 9/1993 | Phelan et al. . |
| 5,255,010 | 10/1993 | Mackin . |
| 5,258,776 | 11/1993 | Guy et al. . |
| 5,264,926 | 11/1993 | Rylander . |
| 5,264,943 | 11/1993 | Curry . |
| 5,278,578 | 1/1994 | Baek et al. ............... 347/240 |
| 5,387,496 | 2/1995 | DeBoer . |
| 5,471,236 | 11/1995 | Ito ............................ 347/233 |
| 5,724,086 | 3/1998 | Mackin et al. .............. 347/237 |

FOREIGN PATENT DOCUMENTS

| | | |
|---|---|---|
| 497614A2 | 8/1992 | European Pat. Off. . |
| 601485A2 | 6/1994 | European Pat. Off. . |
| 206917 | 8/1981 | United Kingdom . |

*Primary Examiner*—N. Le
*Assistant Examiner*—Thinh Nguyen
*Attorney, Agent, or Firm*—Staas & Halsey; Nelson Adrian Blish

[57] ABSTRACT

A multiple-source array for use in thermal printing uses source interleaving to avoid overlapping of the dye-transfer tracks upon the donor material in a single pass. This prevents the formation of artifacts in the image because of thermal interaction among either the sources or printing spots. This also permits the thermal array to be oriented predominantly perpendicular to the first-scan direction so that any arcuate shape of the array causes minimal spacing variations of the scan lines and minimizes spacing variations in focus for laser-thermal printing or document source separation for resistive-head thermal printing. Interleaving also allows multiple printheads to be used even when they have different printing characteristics. The array includes independently addressable printing element data channels and a data distributor allowing interleaving to be accomplished in the printhead. The printhead also includes pixel replication circuitry that allows pixel replication in both the fast and slow scan directions.

13 Claims, 8 Drawing Sheets

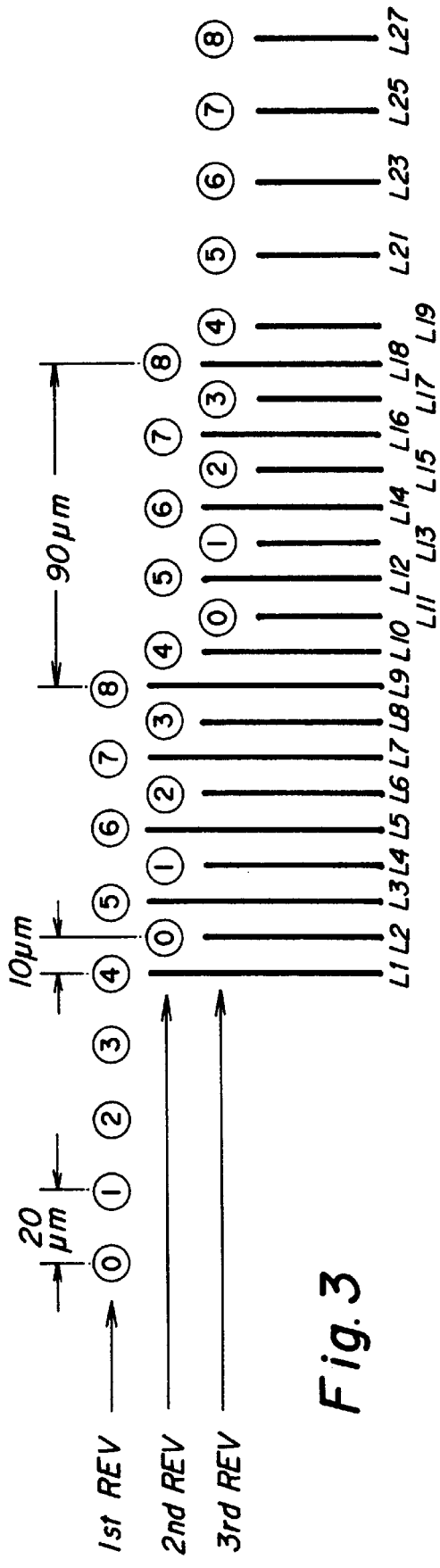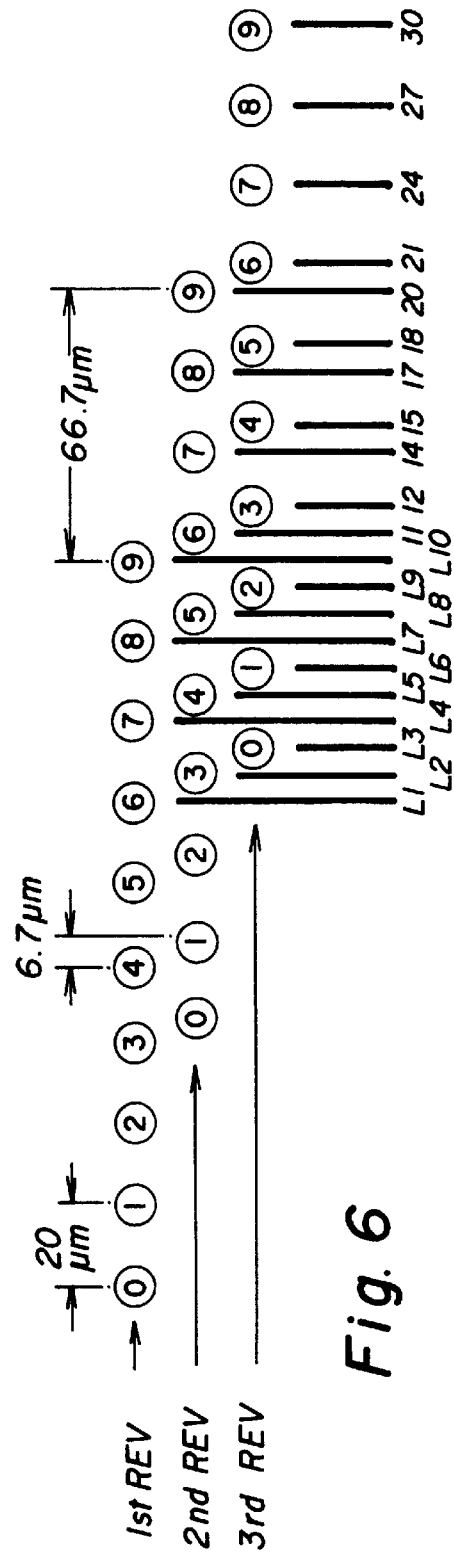

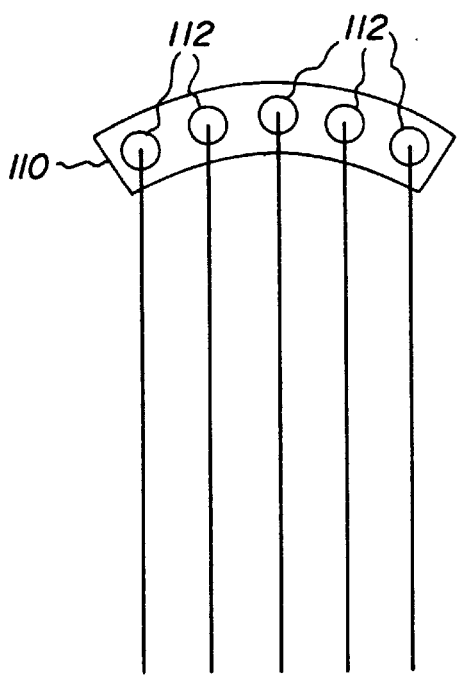
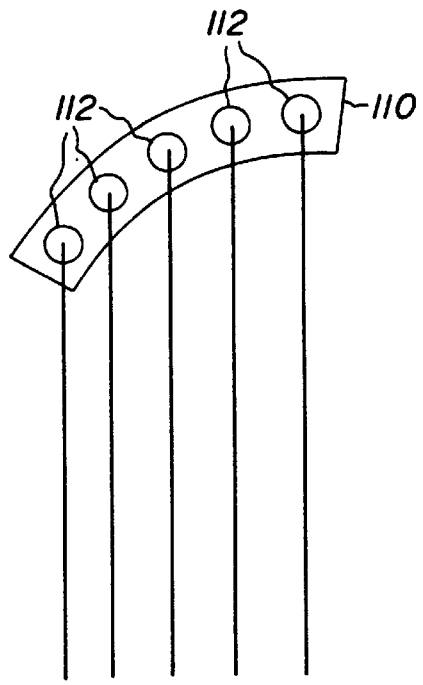
Fig. 7(a)   Fig. 7(b)
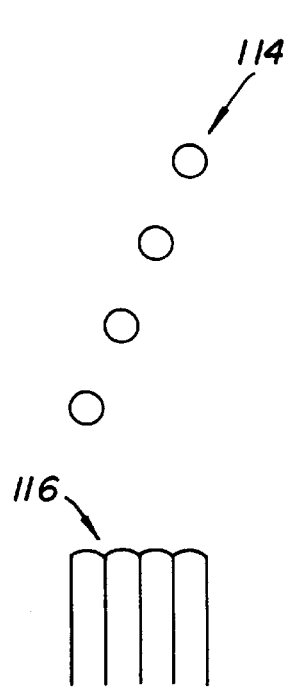
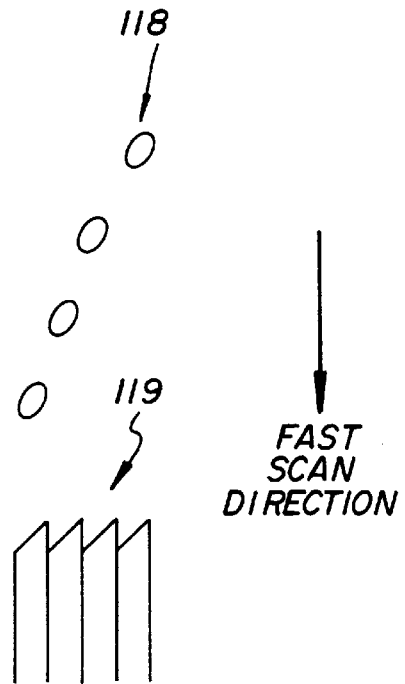
Fig. 8(a)   Fig. 8(b)

INTERLEAVING THERMAL PRINTING WITH DISCONTIGUOUS DYE-TRANSFER TRACKS ON AN INDIVIDUAL MULTIPLE-SOURCE PRINTHEAD PASS

BACKGROUND OF THE INVENTION

1. Field of the Invention

The present invention relates to a thermal printer and, more particularly, to writing on a thermally sensitive material with a printer that deposits energy at multiple locations simultaneously, such as in the form of an array of scanned beams of laser light, in which the lasers have revisable addresses to facilitate interleaving of scan lines. The invention is particularly useful for printers utilizing multiple sources and is suitable for writing interleaved scan lines which can have a different spacing than that of the writing spots on the document.

2. Description of the Related Art

Thermal printers often use multiple sources that print simultaneously to thereby decrease the time required to print an image or a document. These types of printers suffer from a number of different problems. The sources may not be able to be fabricated sufficiently close together to print lines as close together as desired, and thus undesired unprinted spaces may be left between neighboring printed lines. Fabricating the multiple sources very close together may result in thermal cross-talk among the energy sources and/or among the imaging points on the document. The thermal buildup among neighboring writing spots and the duration of exposure at a single location may be so great that the support for the imaging material becomes misshapen. Further, some of the dyes or pigments used for facilitating the energy deposition or for providing the image density may melt and dissolve into the support, producing unwanted artifacts. The array of sources may also not be straight, so that tilting the source array to narrow the space between printing lines produces a spacing variation among the printed lines. Deviations of the printing spots from circular symmetry (i.e. oblong spots or any spot with more than one maximum along a direction perpendicular to the length of the array) may produce ragged edges of image density when printing with a tilted multiple-source array. The images of some sources in the tilted array may be out of focus while others are in focus when projected onto the cylindrical surface of a drum carrying the imaging material. Slight misplacement of the multiple-source array on a subsequent swath or pass may produce objectionable banding at the spatial frequency of the reciprocal of the swath width. The spacing between lines can only be changed by rotating to a different tilt angle; by activating a subset of the sources; or by changing the optical magnification in the case of energy deposition by light beams.

In the final program of the IS&T's 47th annual conference at the Radisson Hotel in Rochester Plaza on May 15–20th, 1994, in Rochester, N.Y., Vol. 2, pages 608–611, Dan Gelbart of CREO Products, Inc., of Canada acknowledged in a paper, entitled High Power Multi-Channel Writing Heads, particularly on page 610, that thermal interactions can occur among neighboring beams when writing on thermally sensitive materials with multiple-source printheads, and that these interactions may be unequal throughout the swath and may be deleterious for the printed image. The paper also states: "Exposure heads which do not write contiguous bits are free from these problems since there is no lateral thermal interaction between the channels (as long as the channel spacing is several bits)." Interleaving is mentioned in the second paragraph on page 609 of this paper as one way to write thermal tracks, although interleaving is not proposed as a way to reduce thermal interactions by "writing contiguous bits with non-contiguous beams". The paper also notes an incorrect limitation on interleaving as: "The distance between the writing spots is always one bit more than the number of beams, otherwise continuous interleaving is not possible."

Commonly assigned U.S. Pat. No. 4,900,130, entitled "METHOD OF SCANNING", which issued to Daniel D. Haas on Feb. 13, 1990, describes a method of moving a multiple-source array at constant step size or constant velocity to make multiple passes so that interleaving produces scan lines that are more closely spaced than the writing spots on the documents.

U.S. Pat. No. 4,009,332, which issued to D. Van Hook on Feb. 22, 1977, and U.S. Pat. No. 4,063,254, which issued to S. Fox et al. Dec. 13, 1977, describe interleaving multiple ink-jet nozzles in a printhead. Making nozzles as close together as the desired spacing of ink drops on the media is "impractical". When the nozzle array is at an angle to the drum axis, the drops from the different nozzles in the array have different flight times due to the different distances to the drum surface. This results in drop misplacement. While the problem of different flight times can be avoided by arranging the nozzles so that all of the nozzles are equal distance from the drum surface, a more desirable solution would permit complete freedom on the center-to-center spacing of the nozzles which would allow a center-to-center nozzle spacing larger than the center-to-center spacing of the drops on the paper in the actual direction with negligible sacrifice of either printing speed or resolution.

U.S. Pat. No. 4,232,324, which issued to S. Tsao on Nov. 4, 1980, describes interleaving multiple ink jet elements in one printhead or among several printheads for scanning or for printing.

U.S. Pat. No. 4,978,971, which issued to H. Goetz et al. in December of 1990, discloses electronically revising the order in which data is supplied to a printhead by utilizing floating pointers for computing the next address in the frame store from which to transmit the image data in order to accommodate interleaved printing while alternating between forward and backward scanning directions.

U.S. Pat. No. 5,264,943, which issued to D. Curry on Nov. 23, 1993, discusses a multiple-beam printer with the capability of registering one raster-written image upon another previously written image within a precision of one raster spacing while accommodating interleaving of multiple beams. The main image data storage called the "image generator" is apportioned or divided into "image-generator channels", each "image-generator channel" containing the data for at least one raster line of the image. There are typically exactly as many "image-generator channels" as there are independently modulated elements in the printhead, in which case all of the data to be written by a single printhead source passes through the same single "image-generator channel". But no specific "image-generator channel" is permanently associated with any specific printhead source. A "programmable channel assignment switch" connects each "image-generator channel" to a specific single one of the printhead sources. This direct connection prevents all other printhead sources from receiving any data from this "image-generator channel" for the duration of printing this one image plane since this "programmed channel assignment switch" is only changed between printing images. A programmed logic array is used to fabricate the "programmed channel assignment switch". A "programmable delay" instructs each channel of the image generator concerning the number of line sync signals that "image-generator channel's" data should be delayed so that the raster lines are interleaved in correct order on the image.

Commonly assigned U.S. Pat. No. 5,164,742, which issued to Seung Ho Baek et al. in November of 1992, teaches the use of multiple exposures of those scan lines which are written by elements near the ends of an array.

Commonly assigned U.S. Pat. No. 5,168,288, which issued to Seung Ho Baek et al. in December of 1992, uses an optical fiber bundle to convey light from an array containing fewer elements than needed to span the indexing direction on the document. The printhead angles are adjusted to produce the requisite scan line spacing. Scanning-speed control is mentioned for modulating the image density in addition to light-amplitude control.

U.S. Pat. No. 5,247,315, which issued to Phelan et al., presents two different ink jet printing schemes for preparing textile screen-printing plates. In the first case, each pass of a multiple-nozzle printhead overlaps a previous swath by half to reprint the bottom half of the previous swath to insure adequate coverage. In the second case, alternate pixels are exposed on one scan followed by exposures of the intervening pixels on the next scan so that pixels contiguous in the fast-scan direction are not printed on a single pass. This avoids the printing of contiguous pixels and is extended to two directions by printing a checkerboard pattern on each pass. Staggering lines of printed pixels in the slow-scan direction while only printing alternate pixels in the fast-scan direction circumvents stopping the slow-scan displacement for the duration of two passes along the same swath.

U.S. Pat. Nos. 4,320,406; 4,540,996; and 4,855,752 describe arrangements used in ink-jet printing for writing interleaved patterns with more than one multiple-source printhead in which each printhead's array is offset by a fractional amount of the spacing between elements in each printhead.

Both ink-jet and thermal-transfer imaging produce an image on an image-recording material (possibly the donor or the receiver in the case of thermal-transfer imaging) but thermal imaging's interaction is due to energy transfer, not to mass or fluid interactions of the ink drops in ink-jet imaging. For instance, waiting between successive exposures of a single location by a time (for example, 6 msec) about 40-fold longer than the characteristic time required for the heat to diffuse a distance equal to the writing-spot width (160 $\mu$sec for thermal diffusion over a $\sigma$=5 $\mu$m writing-spot distance in plastic for an example of a graphic-arts printer) permits the temperature to drop to about 0.5% of its maximum value, i.e., to within about 3° C. of ambient temperature, avoiding thermal interaction. Avoidance of ink mixing may require seconds for absorption of the ink into the paper or drying of the ink. Thermal interaction usually spreads to a greater distance by thermal diffusion with passage of time, whereas liquid flow can draw greater amounts of ink into the center of the scan lines.

As can be seen from the above discussions ink-jet printing does not suffer from problems associated with the energy transfer within the donor material because no donor material is involved. Thermal printers, on the other hand, suffer from artifacts that can be caused by thermal energy transfer within the donor material which results in artifacts being created on the donor or on the receiver material.

What is needed is a thermal printing method, particularly for high power laser thermal printers, that prevents energy transfer between scan lines on the donor material from creating artifacts in the donor or the receiver material.

Thermal printers of the high energy type also typically include a fixed relationship between the order of input data and the particular laser that writes the data. This fixed relationship reduces the flexibility of the head and particularly makes it difficult to solve the artifact problems noted above. This fixed relationship between data order and identity of the writing laser frustrates adding more writing channels or changing the printing resolution by all-electronic means, possibly demanding more memory with complicated methods of data transfer which slows the provision of image data to the writing channels.

What is needed are lasers of a head that can have data routed thereto by an address in which the addresses of each laser can be changed allowing the head to be flexible in data writing order.

SUMMARY OF THE INVENTION

It is an object of the present invention to provide a thermal printing method using scan line interleaving while avoiding overlapping of dye-transfer tracks upon the donor material within a single pass of the multiple-source array to avoid artifacts of thermal interactions among either sources or printing spots.

It is another object of the present invention to permit the array to be oriented predominantly perpendicular to the fast-scan direction so that the arcuate shape of the array, or other deviation of the array from straightness, causes minimal spacing variation of scan lines.

It is also an object of the present invention to minimize variations in focus for laser-thermal-dye transfer imaging.

It is yet another object of the present invention to minimize variations in source to image-recording-medium separation for laser-thermal-dye transfer imaging and for resistive-head thermal printing.

It is an additional object of the present invention to minimize thermal energy transfer within a donor material to reduce printing artifacts.

It is still another object of the present invention to provide a method which avoids single-printhead-pass overlap of scan line regions of the donor material in which the temperature rise caused by thermal energy exceeds the sublimation temperature or activation threshold at which dye is transferred from the donor.

It is also an object of the present invention to provide a thermal laser printing system that reduces thermal energy artifacts.

It is another object of the present invention to provide a method for utilizing several multiple-source printheads simultaneously while avoiding overlapping of any of the dye-transfer tracks upon the donor during a single pass of these several printheads to avoid artifacts of the thermal interactions among either sources or printing spots.

It is a further object of the present invention to provide a method for combining scan lines exposed by several multiple-source printheads in a manner that minimizes observability of differences between the amounts of dye transferred by the various printheads when instructed to transfer the same amount of dye.

It is still another object of the present invention to provide a method to interleave scan lines for sources producing different colors in the image.

It is yet another object of the present invention to provide a method for interleaving scan lines produced by one or more multi-source modulator arrays controlling their transmission of the light emitted by one or more lasers or incoherent sources to minimize thermal interactions among the scan lines on the image-recording material and to minimize observability of different amounts of dye transferred by the various printheads.

It is an additional object of the present invention to provide laser channels of a multiple source printhead which have addresses that can be changed or revised so that interleaving can be facilitated.

It is an object of the present invention to provide independent data channels that modulate the corresponding writing elements independently of each other.

It is a further object of the present invention to provide lasers with addresses and logic allowing the laser to recognize and accept data addressed to the laser.

It is another object of the present invention to provide addressable lasers that facilitate alignment of scan line ends.

It is also an object of the present invention to provide print channels that include the ability to delay the start of printing.

It is a further object of the present invention to provide a printhead that will change resolutions in both the fast and slow scan direction by replicating pixels.

It is yet a further object of the present invention to provide method and apparatus for changing the resolution by all-electronic switching.

It is an object of the present invention to facilitate changing the number of active writing channels or adding more channels.

It is also an object of the present invention to permit performance of interleaving or of pixel replication with minimal or nearly minimal memory requirements.

It is another object of the present invention to allow fast transfer of the data during distribution to the channels.

The above objects can be accomplished by a system performing thermal printing using interleaving while avoiding overlapping of dye-transfer tracks upon the donor material within a single pass of the multiple-source array to avoid artifacts of thermal interactions among either sources or printing spots, to permit the array to be oriented predominantly perpendicular to a fast-scan direction so that any arcuate shape of the array causes minimal scan-lines spacing variation, and to minimize variations in focus or variations in document-source separation for resistive-head thermal printing. Neighboring dye-transfer tracks are considered to be discontiguous for a single pass of the multiple-source printhead if there remains between each neighboring pair of scan lines potentially exposed during that pass of the printhead or printheads a region from which no dye was transferred during that printhead pass. Dye is transferred from these intermediate or in-between areas by subsequent interleave scans of either later sources of the same printhead or by elements in other printheads to prevent unprinted lines in the completed image. This arrangement provides the ability to electronically vary scan line spacing with some cases requiring commensurate adjustment of the translation speed or step size of the writing-spot array perpendicular to the fast-scan direction. Electrical circuits appropriately select the data encoding the image in a sequence generating modulation of the source at the proper times to produce the image.

The system facilitates interleaving by providing an addressable data channel for each printing element in which print data is routed to the channels by producing addresses for the print data. The addresses of the channels can be changed facilitating the changing of the interleaving factor. Delay in the start of pixel printing is provided to facilitate alignment.

The system also allows the printing resolution to be changed within the printhead by replicating the pixel data in both directions of the media.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

In the detailed description of the preferred embodiments of the invention presented below, reference is made to the accompanying drawings, in which:

FIG. 3 illustrates interleaved writing for three passes of a nine-element printhead with 20 $\mu$m writing spot spacing interleaving by a factor of k=2 to produce a 10 micrometer raster spacing in the completed image, initiating writing with the first possible source that can produce a complete raster with no unexposed scan lines;

FIG. 6 exhibits the results of modifying the step size between swaths for a 10-element printhead indicating the identity of the source responsible for exposing each raster line in the image with the same inter-element spacing as the printhead in FIG. 2 to achieve a smaller raster spacing of 6.7 micrometers of raster spacing by using an interleaving factor of k=3;

FIG. 7(a) illustrates the array of multiple sources equally spaced along an arc creating minimally varying spacing between a tracks when the array is untilted;

FIG. 7(b) illustrates the asymmetric, more substantially unequal spacing when tilted during a scanning operation;

FIG. 8(a) shows the smooth edge produced in the image by a tilted array of round writing spots;

FIG. 8(b) shows the ragged edge produced by tilted array of oblong writing spots;

DESCRIPTION OF THE PREFERRED EMBODIMENTS

The present description will be directed in particular to elements forming part of, or cooperating more directly with, apparatus in accordance with the present invention. It is to be understood that elements not specifically shown or described may take various forms well known to those skilled in the art.

The term "source" refers in this description to the element generating or emitting energy within the printhead which in this laser example is the lasing region and would be a resistive heating element in the resistive type printer. The term "writing spot" refers to the area of heat deposition onto a thermally sensitive image-recording material, hence the image of the source on the thermal material for laser thermal dye transfer or the area of contact between the heating source and the material for resistive thermal dye transfer. The lenses between the source and the imaging document may cause the "source spacing" to differ by a proportional amount from the "writing-spot spacing".

Figure 1:
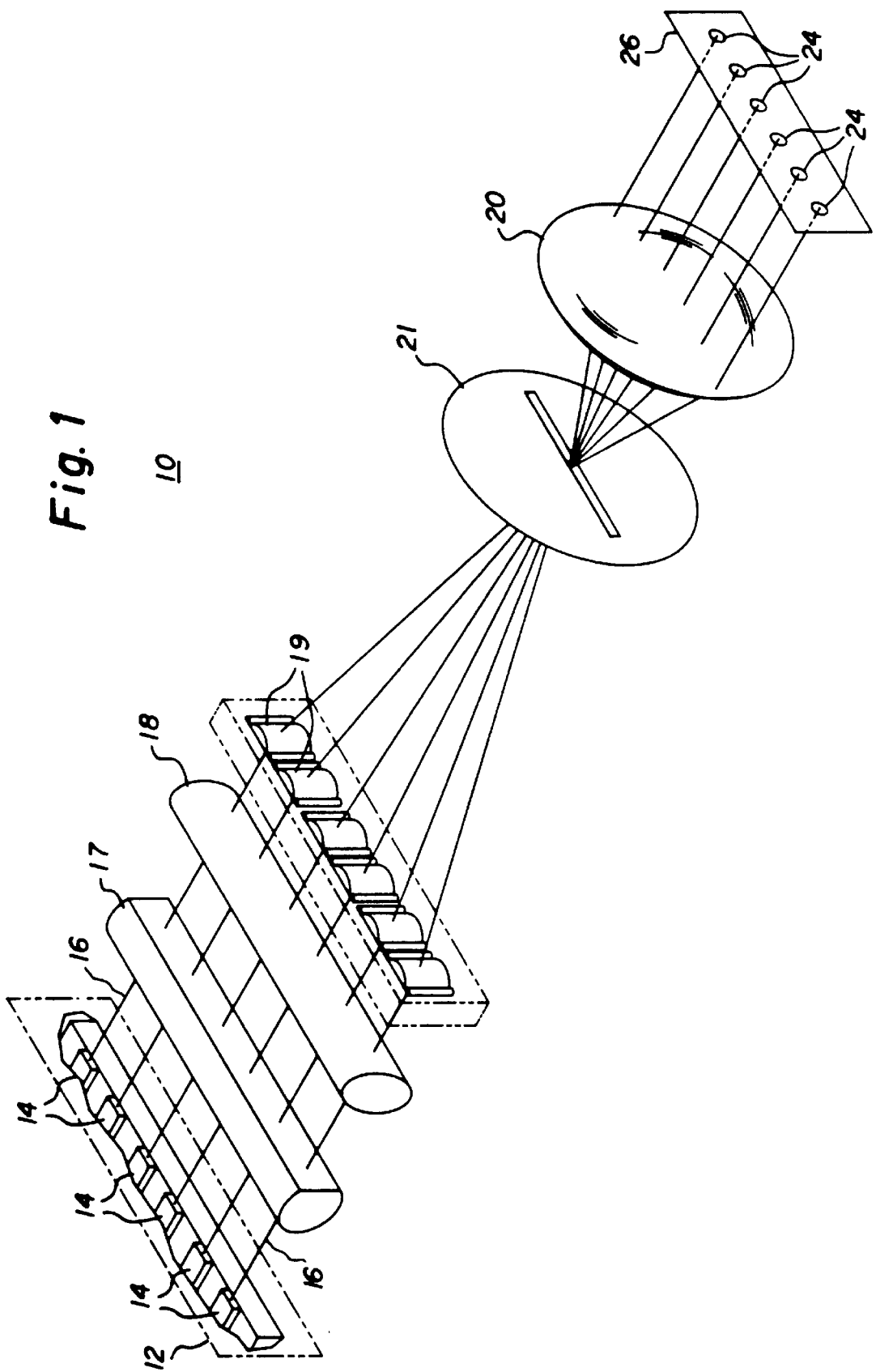
FIG. 1 depicts a typical laser writing head and lens system to project writing spots from the multiple sources onto the image recording material.

The present invention is applicable to thermal writing heads of the resistive and laser type. A typical laser writing head 10, is illustrated in FIG. 1 and described in more detail in U.S. patent application Ser. No. 07/986,207. Other printheads such as the SDL-5621-I1 available from Spectra Diode Labs or a 10 source printhead described in a publication by RCA could also be used. This laser writing head 10 includes a diode array 12 composed of a semiconductor material including lasing regions 14. The typical array includes ten such lasing regions or sources 14 (with a six source head being shown in FIG. 1) but can have an arbitrary number greater than one.

Each of the regions 14 produces an infrared laser beam 16 which is focused by a series of lenses 17–20, and a pupil 21 creating writing spots 24 on a thermally sensitive image-recording material 26 sometimes called a donor, such as mentioned in U.S. Pat. Nos. 5,387,496 and 5,234,890. The laser spots vaporize or ablate color carrying material from the material 26. When the material 26 is to be the primary image substrate, such as when the material is used for hard copies of computed-tomography, x-ray or magnetic resonance images, the image is viewed by viewing the donor. Material 26 can also be the final product of the thermal imaging process when used as a film master called a "separation" to be projection printed or contact printed onto a photosensitive lithographic printing plate. However, some donor materials, such as Eastman Kodak APPROVAL Donor DK02 Cat. No. 862-4199, are designed to transfer color carrying material to a receiver (not shown), such as Eastman Kodak APPROVAL Intermediate 101 Cat No. 831 5582. The receiver would be the primary image carrying material in this situation. Other materials can be metal printing plates from which metal is ablated by the laser beams, or plastic-coated metal printing plates from which the plastic coating is ablated by the laser beams.

Typically, printheads such as illustrated in FIG. 1 operate with a rotating drum (not shown) carrying the thermal material 26 and on which the beams 16 impinge. The direction of drum rotation is called the fast scan direction and a direction transverse to the rotation direction or the direction parallel to the axis of rotation of the drum is called the slow scan direction. As the drum rotates the lasing regions are turned on and off responsive to image data provided to the printer and the head slowly moves across the drum. The on/off beams make lines or tracks across the thermally sensitive material 26. The printhead may move at a constant speed across the drum while the drum rotates, or it may stop during the exposure of one or more swaths then step to the next position for exposure of the subsequent swath or swaths. The on/off pattern and the drum rotation produces regions of the donor 26 where material has been removed and other regions where material remains. The amount of material removed depends on the strength of the beam, the size of the beam at its intersection with the exposure-absorbing dye layer in the donor and the length of time the beam irradiates an area. Because the material of the donor 26 is removed via heating, because the area around the spot is not heated and because thermal diffusion from a point of heat source obeys a Gaussian distribution, the temperature profile is shaped like a Gaussian curve. The amount of material is removed to depths approximately in the shape at the central portion of a Gaussian curve with the peak in the center of the beam.

Figure 2A:
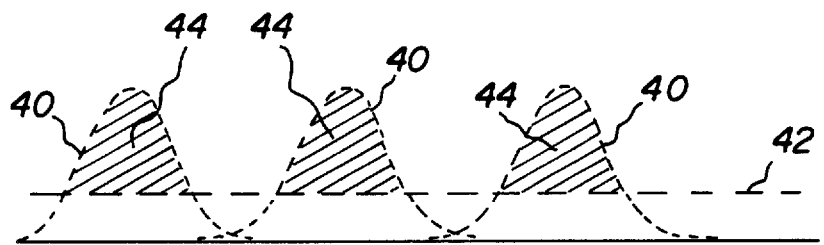
FIG. 2(a) illustrates exposure profiles of three neighboring writing spots during the initial pass across a previously unexposed region of the image recording material and 2(c) illustrates a subsequent pass over the same region with three possibly different writing spots.

FIG. 2(a) is a cross-sectional view of exposure profiles 40 deposited by three neighboring writing spots during one pass of a printing head and taken perpendicular to a fast-scan direction. The exposure profiles of the spots are represented as dotted curves 40. A dashed line in FIG. 2(a) represents a threshold exposure level 42 which might be the vaporization level for transferring dye by exposure with light beams or the enhanced mass-diffusion level for transferring dye with heat conducted from a resistive head. When the beam profile 40 is above the threshold 42, dye is ablated from the donor 26. The hatched area 44 of each exposure curve indicates the exposure thermal energy available to transfer dye from the donor 26.

Figure 2B:
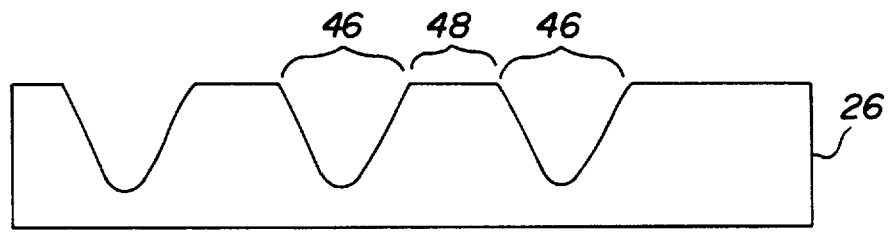
FIGS. 2(b) and 2(d) represent the dye remaining on the donor after the initial and subsequent passes, respectively, of multiple source printhead.

FIG. 2(b) represents the dye remaining on the donor 26 after this first pass of a multiple-source printhead with a region 46 of dye transferred by each source separated from its neighboring track by a region 48 in which no dye transfer has occurred because too little exposure energy was provided in this area. The donor 26 cools in the region 48 while the writing spots are scanning farther down the document. FIG. 2(b) illustrates discontiguous writing tracks in that the writing spots for the tracks are separated so much that thermal interaction between the tracks is reduced to a sufficiently low level that regions of untransferred dye remain between the lines of removed donor material.

Figure 2C:
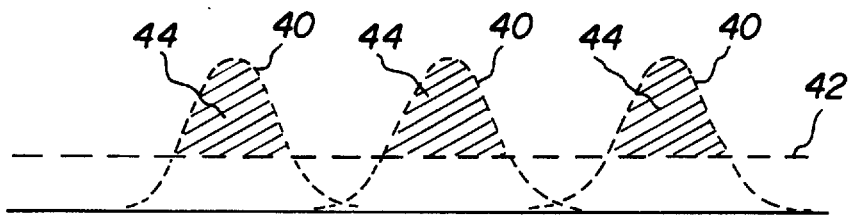

FIG. 2(c) illustrates the exposure profiles 40 for the writing spots exposed on a subsequent pass, with an interleaving or interlacing factor k=2, as dotted curves superimposed on the same dye-transfer threshold level 42 as in FIG. 2(a) where k equals the number of passes necessary to complete a writing operation for a region; these intervening scan lines might be written during sequential passes or might be written during passes separated by one or more passes that do not contribute scan lines to this region, depending upon the spacings of the writing spots, the final raster spacing, and the numerical value of the interleaving factor. It should be noted that the exposure must start again or anew to heat the donor 26 to its transfer threshold 42 since the heat deposited during previous swaths has diffused away.

Figure 2D:
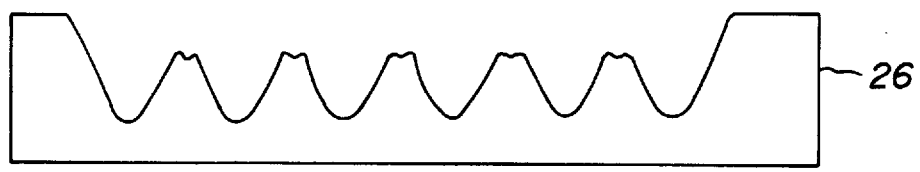

FIG. 2(d) shows the dye remaining on the donor 26 after completion of the interleaved exposure in which dye is transferred from all parts of the image regions upon completion of the interleaved exposure process so that no unexposed streaks remain in the image. The exposure profiles 40 exceeding the threshold 42 overlap between passes so that no unprinted regions will be produced.

Maintaining neighboring dye-transfer tracks discontiguous within a pass minimizes the interaction between neighboring scan lines on the donor or on the dye-ablative imaging material. These interactions can be due to direct overlap of the writing spots, or, for printing with a tilted multi-source printhead or with several staggered multi-source printheads, due to overlap of the track of heat deposited by one scan line with a subsequent writing spot or due to diffusion of heat from one scan line to the path of a subsequent neighboring writing spot. All of these interactions engender greater temperatures in the regions of overlap or of thermal diffusion, transferring greater amounts of dye from those interacting regions than would occur in the absence of thermal interactions. To illustrate the consequences of these thermal interactions, writing with one isolated laser between two inactive neighbors can be compared to writing with two neighboring spots depositing their exposures either simultaneously or in a sufficiently brief period of time that the second spot's exposure is deposited while a substantial fraction of the heat generated by the first spot remains within the regions of overlap or of lateral diffusion. The single isolated scan line deposits energy and removes dye in accord with any of the isolated scan lines in FIGS. 2(a) and 2(b). Enough heat exists in the region between the centers of two overlapping neighboring scan lines to exceed the threshold 42 and transfer a substantial amount of dye from this overlapping region. More dye is transferred in total from the two overlapping neighboring scan lines than would be transferred by two isolated scan lines. This greater dye transfer when two neighboring scan lines are exposed than when two isolated scan lines are exposed can cause image artifacts, such as visibility of the edge of each swath or moire in halftone patterns composed of numbers of scan lines that are not submultiples of the number of sources in the printhead. By employing interleaving, the imaging energy imparted by each beam is deposited within the very short time period required for the writing spot to scan across that location. The donor cools for at least the time required for the writing spot to scan the entire length of a scan line in the image before a neighboring track is exposed, eliminating or substantially attenuating these thermal interactions between neighboring scan lines. The time to complete one pass before the next interleaved pass must be at least as long as the ratio between the length of the image along the fast-scan direction (and possibly longer to accommodate a small image exposed on a large-circumference drum) and the scanning speed. The scanning speed which can be used to transfer an adequate amount of dye for imaging purposes is in turn influenced by the available light power, the size of the writing spot, and the sensitivity of the donor to the light. The shortest time between passes would be obtained with the most powerful laser focused to the smallest writing spot on the most sensitive medium in order to write the smallest image. For the example of a 35 mm slide (24 mm image area in its shortest dimension) written with a 1 Watt (W) laser within an array focused to its diffraction limit of 1 $\mu$m waist-radius exposing a raster spacing Y of 1 $\mu$m on material requiring only 0.06 J/cm$^2$ to create an image, successive passes would occur at 14 $\mu$sec intervals during which time the donor at overlap would have cooled to about 5% of its previous hottest temperature. The temperature profile remaining when the next exposure occurs in this extreme case may, in some circumstances, be just great enough to produce a noticeable interaction in the form of greater dye transfer than desired and a slightly longer scan interval may be necessary. In most systems suited for the larger images in the graphic arts (usually 20 inch scan length) with about 0.5 W focused to a 10 $\mu$m waist radius on the image-recording material exposing raster lines spaced 10 $\mu$m in the final image with material sensitivity of about 0.5 J/cm$^2$, successive scans occur every 60 msec permitting cooling of the material to less than 0.5% of its previous hottest temperature so that thermal-interaction artifacts are reduced below an objectionable level. The example of FIG. 3 discussed below is typical of this situation.

FIG. 3 is a schematic diagram showing the exposure sequence for a printhead, either resistive or light-beam writing spot, comprising nine sources producing writing spots 20 micrometers apart on the donor 26, with the index of the source (numbered from 0–8) in the circle directly above the line (L) indicating the center of its dye-transfer track. FIG. 3 shows lines of varying lengths, however, the lines on the actual images would be all of the same length and the various elongations of the lines are provided to emphasize the sequence of passes and the correspondence between raster number and exposing source. The indices of the completed lines in the image are denoted by the number following the character "L" beneath each of the dye-transfer tracks. On the first pass or revolution of the drum, shown to the left in FIG. 3 only sources 4–8 are activated because interleaving will not have an opportunity to expose the spaces separating writing spots 0–4 scanned on the first pass. An interleaving factor of k=2 has been chosen for the printhead which moves a step or distance of 90 micrometers by the time the writing spots scan through this region on the next pass, permitting element 0 on the second pass to transfer dye along a track between tracks exposed by sources 4 and 5 on the first pass. The individual sources print with raster lines according to the concordance of Table I:

TABLE I

| On Pass 1 | On Pass 2 | On Pass 3 |
|---|---|---|
| Source 0 prints nothing | | |
| Source 1 prints nothing | | |
| Source 2 prints nothing | | |
| Source 3 prints nothing | | |
| Source 4 prints Line 1 | Source 0 prints Line 2 | |
| Source 5 prints Line 3 | Source 1 prints Line 4 | |
| Source 6 prints Line 5 | Source 2 prints Line 6 | |
| Source 7 prints Line 7 | Source 3 prints Line 8 | |
| Source 8 prints Line 9 | Source 4 prints Line 10 | Source 0 prints Line 11 |
| | Source 5 prints Line 12 | Source 1 prints Line 13 |
| | Source 6 prints Line 14 | Source 2 prints Line 15 |
| | Source 7 prints Line 16 | Source 3 prints Line 17 |
| | Source 8 prints Line 18 | Source 4 prints Line 19 |
| | | Source 5 prints Line 21 |
| | | Source 6 prints Line 23 |
| | | Source 7 prints Line 25 |
| | | Source 8 prints Line 27 |

Once pass 3 is completed every source is turned on as specified by the print data on every subsequent pass as the donor is scanned until the end of the slow scan is approached. On the last printhead pass, which is exemplified by the 3rd Rev. comprising the shortest group of nine equally spaced scan lines completing the rasters for the image area on the right half of FIG. 3, sources indexed 5–8 must be inactivated because there will be no further opportunities to fill in the spaces between tracks traversed by these sources.

Interleaving of the scan tracks as illustrated in FIG. 3 can be accomplished in a number of different ways.

In one approach, the computer or raster image processor could rearrange the print lines of the image in the order in which they are to be printed and then provide them to the printer electronics in the proper interleaved order. This is the way in which interleaving could be accomplished using a frame store accommodating the entire image with fixed connections between the frame store's image data locations and the writing sources. For example, the image-encoding data could comprise 1800 scan lines of 3000 pixels per scan line. If these data were to be printed by a 9-source printhead using an interleaving factor of k=2 as schematized in FIG. 3, and if the image frame store were configured to transfer all of the data for one entire scan line to a buffer associated with a single source in the printhead, with a buffer available for each source, then the first 12,000 storage locations in the frame store would be filled with "0"'s to inactivate the first 4 sources indexed "0" through "3" during the first pass. Storage locations 12,001 through 15,000 would be filled with the data encoding the first scan line L1 in the image for exposure by source indexed "4" on that first pass, while storage locations 15,001 through 18,000 would be filled with the data for the third scan line L3 to be exposed by source indexed "5" on that first pass. Storage locations 18,001 through 21,000 would receive data for line L5 destined to be exposed by source "6", locations 21,001 to 24,000 line L7 data destined for source "7", and locations 24,001 to 27,000 line L9 data destined for source "8", all to be written on the first pass of the printhead across the image-recording material. Storage locations 27,001 to 30,000 in the frame store would be filled with image data for line L2 to be exposed by source indexed "0" on the second pass of the printhead, while storage locations 30,001 to 33,000 receive line L4's data destined for source "1", storage 33,001 to 36,000 receive line L6's data destined for source "2", storage 36,001 to 39,000 receive line L8's data destined for source "3", storage 39,001 to 42,000 receive line L10's data destined for source "4", storage 42,001 to 45,000 receive line L12's data destined for source "5", storage 45,001 to 48,000 receive line L14's data destined for source "6", storage 48,001 to 51,000 receive line L16's data destined for source "7", and storage 51,001 to 54,000 receive line L18's data destined for source "8", all to be exposed on the second printhead pass. Storage locations 54,001 to 57,000 in the frame store would be filled with image date for line L11 to be exposed by source indexed "0" on the third pass of the printhead, with the rest of the storage assignments following this scheme.

Another approach is for the computer to maintain the lines in the proper left to right or up to down order and index through the print lines in the interleaved order to output them in the proper order for interleaved printing. This is the way in which interleaving could be accomplished when using a frame store accommodating the entire image with fixed connections between the frame store's image data locations and the writing sources. In this example the same configuration comprising N=9 sources writing with interleaving factor k=2 and writing series of 1800 scan lines of 3000 pixels each will be used. This image data could be stored in scan line order, i.e., storage locations 1 through 3,000 contain the data for scan line L1, storage locations 3,001 through 6,000 contain scan line L2's data, storage locations 6,001 through 9,000 contain scan line L3's data, etc. A buffer accommodating one scan line is associated with each source in the printhead. The computer is programmed with a sequence for selecting the storage locations to be transferred and for selecting the buffer receiving those data. The sequence would specify transfer of a negative-numbered scan line L(−7) to the first source indexed "0" then increment the scan line count by the interleaving factor k=2 for each successive source until reaching the 9th odd-numbered scan line in this series, i.e., scan line L9, to complete the first pass; then return to the 9th scan line beyond the initial negative-numbered scan line L(−7), i.e., scan line L2 to be transferred to the source indexed "0" and increment the scan line count by the interleaving factor k=2 for each successive source until reaching the 9th even-numbered scan line in this series, i.e., scan line L18, to complete the second pass; then return to the 9th scan line beyond the starting point L2 for the previous pass, i.e., scan line L1 to be transferred to source indexed "0" and advance by k=2 through succeeding odd-numbered scan lines for successive sources. The sequence requires that the negative-numbered scan lines indicate a transfer of all zeroes to a laser source to inactivate that source, and that 3,000 storage locations constitute each scan line so that the ending storage location for each source is just the scan line number multiplied by 3,000. Prior to the first printhead pass, the computer would send 3,000 zeroes to each of the first four sources indexed "0" through "3" intended to remain inactive during that pass while directing data from storage locations 1 through 3,000 containing data for scan line L1 to the buffer associated with source indexed "4", then skip to storage locations 6,001 to 9,000 containing scan line L3 for transfer to the buffer destined for source index "5", then skip to storage locations 12,001 to 15,000 containing data for scan line L5 destined for source "6", and so forth.

A still further method is to place data for the first pixel to be written by each of the n sources in n successive storage locations, then the second pixel for each of the sources in the next n storage locations, so that each source would not need its own dedicated storage but only need to respond to the most recent value provided by its corresponding storage location among the first n storage locations of the frame store. However, a better approach is to provide the image lines to the printer electronics in their proper or original order and have the electronics route the data to the proper printhead energy source responsive to the particular interleaving being used. This method is discussed in more detail below.

Sources fabricated on more than one substrate, i.e., sources in more than one multiple-source printhead, may be combined as long as the writing spots are located on the thermally sensitive image-recording material within allowable tolerances from their intended positions.

Figure 4:
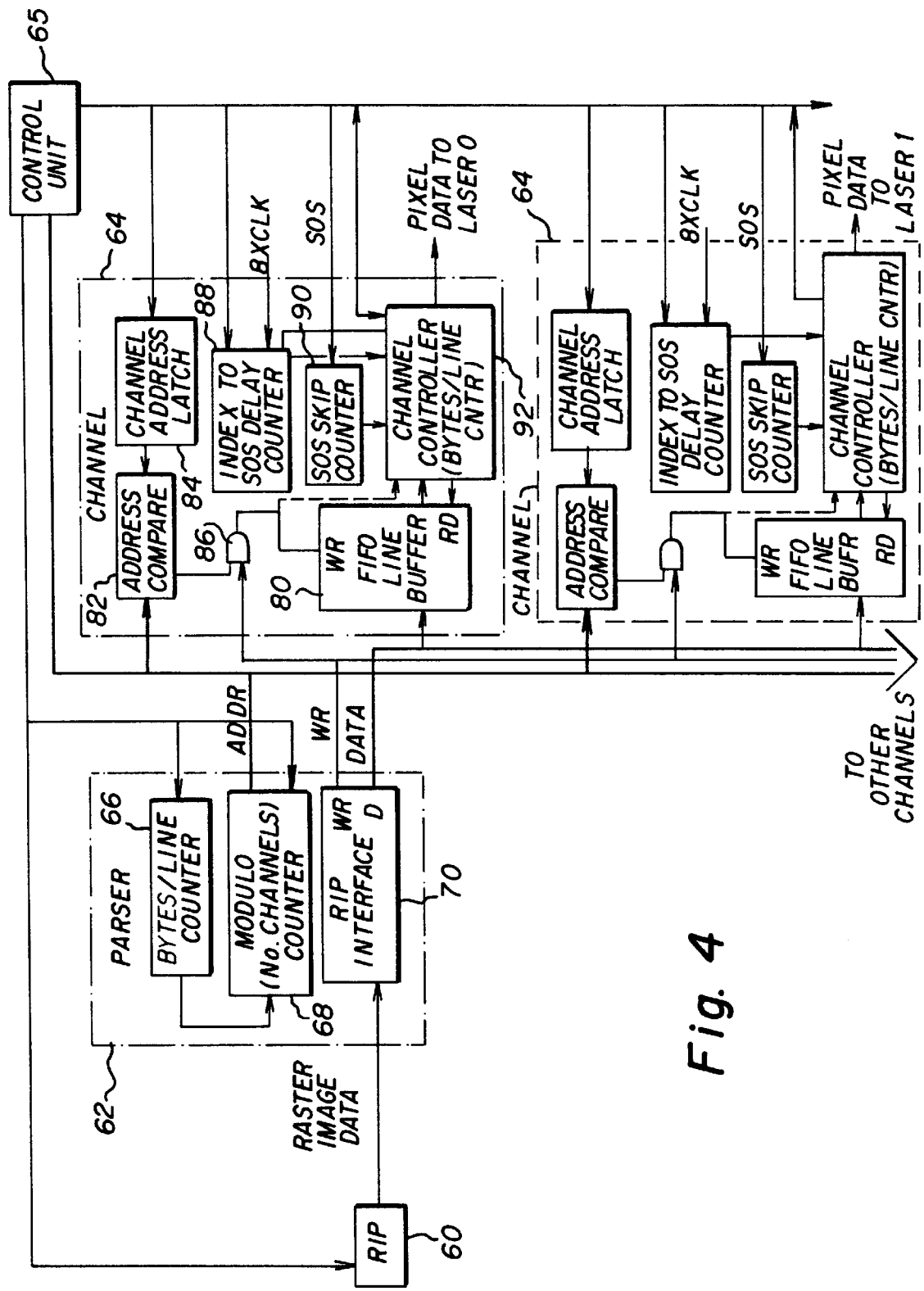
FIG. 4 is a schematic circuit diagram for supplying the data to the source elements in the proper sequence to expose the image.

Referring to FIG. 4, a circuit diagram is shown for implementing interleaving as described in the example of FIG. 3. An external data source 60, such as a raster image processor (often called a "RIP"), supplies a bit map in raster-based format, i.e., in the sequence of the final image, reading each dye-transfer track from beginning to end and reading the dye-transfer tracks from first to last. A parser circuit 62, illustrated in the upper left of FIG. 4 helps each image bit, from the RIP 60, to reach the correct print channel 64 that is responsible for activating the laser exposing that bit on the document. There is a single data channel 64 connected to and responsible for one independently modulatable writing source, such as one of the laser sources 14 of FIG. 1. The parser 62 acts as a data router or distributor to route the data to the appropriate channel. The parser 62 must be informed of the number of active channels in the multiple-source printhead and of the number of bytes per line in the image by a printer control unit 65, such as a computer/microprocessor, a programmed gate array or a group of switches that encodes these numbers. This information controls counting by a programmable byte/line counter 66 where the count value is refreshed in each cycle by a storage register in the counter 66 that stores the count as supplied by the control unit 65. The parser 62 generates the image bit's address (ADDR) with a programmable modulo-N counter 68 based on the line and byte count provided by the counter 66, in which N is the number of active channels. The number of channels can be held in a channel number register of the counter 68 updated by the control unit 65 as needed or the number of channels can be hardwired at the time of manufacture. For example, when a nine laser head is provided N=9 and the image data for scan lines 1,10,19, . . . are associated with a channel 4 address, lines 2,11,20, . . . are associated with a channel 0 address, lines 3,12,21, . . . . are associated with a channel 5 address and so on as can be deduced from previously discussed Table I. The parser 62 continues to generate the address for the same channel while the parser's bytes-per-line counter 66 cycles once through all of the image locations in a scan line. That is, all the data for a single print line is transferred before the address being produced by the parser 62 changes. The bytes-per-line counter 66 is decremented by one every time a byte is written from the parser 62 to the channel 64 having the matching address. An interface 70 is provided in the parser 62 and can have a buffer that is as small as a single scan line's worth of data or as large as an entire image. The size is usually chosen as that of a commercially available memory adequate to hold about fifty scan lines worth of data to accommodate the varying rates at which the RIP 60 provides image data to ensure that adequate amounts of data are available to the writing channels 64 so that a printer's translation subsystems can operate at a constant pace. If the scan lines do not have to be rebroadcast then the interface 70 can be a pass through type with no buffering needed. In this case the RIP interface 70 simply must determine when the next image point from the RIP 60 is present on the data line and ready to be broadcast to the channels and when the corresponding address is ready to be broadcast by counter 68, and then send out the WR pulse to the channels 64 eliciting acceptance of the data by the appropriate channel. The interface 70 in the parser 62 provides the image data for each channel 64 corresponding to a print line along with a write signal (WR) used to synchronize storage in the channels 64. Of course, it is possible for the RIP 60 to perform the address calculation and tag each line with the proper address and this address could be used to control routing or distribution. However, the modulo-N counter 68 of the present invention in combination with the ability of the channels 64 to recognize addresses permits fast transfer of the data with greater flexibility than the alternative and allows immediate sending of the data to the channels 64 rather than requiring that the entire or large segments of the image be stored in the RIP 60 memory until the order can be arranged or addresses added.

Interface 70 includes a dual-ported buffer memory (not shown) adequate for about fifty scan lines of image data as mentioned previously. Dual porting enables the buffer to accept new image data from the RIP 60 at a different rate than the interface buffer distributes that image data to the channels 64. The WR signal produced by the interface 70 is pulsed rapidly to step out image data from the interface buffer to the writing channels 64. The WR signal is derived from the signal counted by the bytes/line counter 66, so this data-stepping signal from the control unit 65 must also be communicated to the interface 70. The interface 70 can be permitted to communicate to the RIP 60 the fact that the interface's buffer is full, causing the RIP 60 to pause. But usually the printer is designed to be able to run at least as fast as the RIP 60 can supply data, allowing the control unit 65 to instruct the printer to run at the appropriate speed to consume data at the same average rate as the RIP 60 is anticipated to provide that image data, obviating the need to send information from the interface 70 to the RIP 60.

Each of the channels 64 has a first-in-first-out (FIFO) buffer 80 large enough to hold several scan lines of data, at least two and preferably about 10, so that temporary variations in data speed from the RIP 60 can be accommodated. This buffer 80 is activated to store data when an address comparator 82 indicates that the address provided by the parser 62 matches a channel address stored in this channel's channel address register or latch 84 at the same time the write signal (WR) from the parser 62 is also active. AND gate 86 permits data-clocking pulses WR to step image data into the FIFO line buffer 80 of channel 64 only in the case of matching addresses assigned to that scan line's image data and to that channel. During operation only the buffer 80 of the channel 64 which has the correct address stored in latch 84 will store the pixel data. A buffer empty signal can be provided by the channel to the control unit 65 whenever the buffer 80 becomes empty. However, a buffer empty signal is not required if the printer's average speed of image data consumption can be matched to the RIP 60 speed of data provision, and if the interface 70 buffer and buffers 80 are large enough to accommodate temporary variations in data provision from the RIP 60 or writing-speed variations of the printer. If the speeds are not matched, a FIFO line buffer empty signal for a specific channel 64 can be generated whenever the accumulated number of all of the WR signals clocking the buffer 80 since the beginning of printing an image approaches or equals the total of the counts accumulated by the bytes/line counter inside the channel controller 92 of each channel 64 since the beginning of that image as might be presented by a total-bytes accumulator (not shown) for that channel 64. Alternately, the dual-ported buffer 80 can contain conventional circuitry capable of determining whether the number of pulses applied to its WR connection for stepping image data into this buffer is equalled or exceeded by the number of clock pulses applied to its RD connection for stepping image data out of this buffer to transmit the FIFO line buffer empty signal. The FIFO line buffer empty lines from all of the channels 64 can be monitored by the control unit 65, which would shut down printing and the translation subsystems if an insufficient amount of data is predicted to be acquired in time to finish printing the incipient swath, then restart translation and printing when sufficient data has been accumulated. The channel controller 92 includes an accumulator (not shown) for the WR signal applied to FIFO line buffer (in which case, the WR signal after passing through AND gate 86 is sent to the channel controller 92 as shown by the dashed line in FIG. 4) and accumulator total bytes for the total number of counts detected by the bytes/line counter inside the channel controller 92. If this difference in accumulated counts exceeds the capacity of the FIFO line buffer 80, a "FIFO line buffer overflow" signal is generated by the channel controller 92 for that channel 64 for sending to the interface 70 (or control unit 65) to pause transmission of image data until more data has been consumed by writing with that channel 64.

The channel 64 is informed that it can start printing by receiving a permission to print signal from the control unit 65 at an appropriate delay after the control unit 65 has told the RIP 60 to start sending data and after the control unit 65 has detected that the fast scan and the page scan translation subsystems are moving at the intended speeds at the intended printing locations. This delay would be adequate for one or a few scan lines to have been transferred to channels 64 that will be required to expose the image-recording material on the first printhead pass. Preferably, the imbalance between the totals in the accumulators for each channel controller 92 detects adequate data in each channel 64, and each channel transmits an "adequate data in FIFO line buffer signal" to the control unit 65, which in turn permits transmission to each channel of the 8XCLK signals to step out the image data through the channel controller 92 and SOS pulses to be counted down by the SOS skip counter 90. This permission to let the 8XCLK signal reach each channel 64 is accomplished by an AND gate (not shown) on each channel's 8XCLK line at its entrance to the counter 88 with the permission to print line from the control unit 65 as the second input to each of those AND gates. Alternately, this AND gate could reside in the counter 88 so that the permission to print line would be part of the line from the control unit 65 to each counter 88. As another and preferred alternative, with the circuitry residing in the control unit 65 for producing the 8XCLK signal from pulses generated by the fast-scan translator's encoder, the permission to print signal can be ANDed with the 8XCLK signal within the control unit 65 so that the 8XCLK signal is only distributed to the channels 64 when printing is permitted. Similarly, an AND gate could be incorporated at the input to the counter 90 to accept the permission to print signal from the control unit 65 on one line and the SOS pulse from the control unit 65 on another line; since both of these signals come from the control unit 65, the logic preferably resides in the control unit 65 so that SOS pulses are only sent from the control unit 65 when permission to print has been granted.

FIFO line buffer 80 is indicated as full by a comparison of the totals in the accumulators for each channel controller 92, causing transmission of a FIFO line buffer full signal from each channel back to the control unit 65. Alternately conventional buffers can perform this bookkeeping and the signal can be provided to the parser 62. When the parser 62 receives the full signal, the parser 62 supplies a corresponding signal to the RIP 60, the RIP 60 is stopped from sending further data. Receipt of a "FIFO line buffer full" indication from any of the channels causes the control unit 65 or RIP 60 to suspend broadcasting of image data from the interface 70 if the control unit 65 determines that the full channel will be required to accept more data before consuming an equivalent amount of data through printing. The fractional pixel clock, denoted "8XCLK", originating from the rotation of the drum, is connected to the channel 64 in the upper right (FIG. 4), operates at eight times the rate of the data clock and is accumulated in a programmable delay counter 88 that includes storage for storing the delay down loaded from the control unit 65. This allows the system to adjust the activation time of the channels in the fast-scan direction to compensate for any tilting of the printhead. A programmable counter 90 (denoted "SOS Skip Counter") in each channel 64 instructs that channel 64 to skip some of the start-of-swath pulses ("SOS") from the drum rotation encoder, so that the channels 64 with low index numbers in FIG. 3 will not initially activate their sources until after the first swath or pass, as required by the incomplete raster at the leading edge of the document. The channel controller 92 is responsive to count pulses from counters 88 and 90, reads pixel data from buffer 80 and outputs it to the corresponding source of the laser head. The principal task of the 8XCLK/ byte counter in controller 92 is to count down the 8XCLK signals by eight to step out the image data from the buffer 80 to the writing source at the rate matched to the traversal of the writing spot across the image-recording material in the fast scan direction. A logic circuit such as an AND gate associated with this counter in controller 92 prevents clocking out of the image data until the number of skipped scans has been satisfied for channels 64 that should not expose scan lines during at least the first pass, as would be the case for channels with indices 0 through 3 when interleaving N=9 sources with interleaving factor k=2 as shown in FIG. 3. A bytes/line counter in controller 92 can be provided which keeps track of whether a full scan line data has been stepped out of the buffer 80 since the occurrence of the most recent "Start-Of-Swath" pulse indicating a completed fast scan cycle, i.e., a complete revolution of the drum. If the number of image data values in a scan line is less than one-eighth of the number of 8XCLK pulses derived from the fast scan encoder during one fast scan cycle, then the 8XCLK pulses are prevented from clocking further image data values out of the buffer 80 since those further image data values specify exposures for the next scan line. Attainment of the number of image data points in a scan line by the channel controller's bytes/line counter could cut off the clocking pulses transmitted from the counter 88 to the channel controller 92, and bytes/line counter of the controller 92 could be reset by the next SOS pulse propagating through the counter 90.

Table II illustrates the address assigned to each of the channels 64 for matching with the address generated by the parser 62 for each scan line of image data, as well as the initial value placed in the Start-of-Swath Skip counter 90 of channel 64 according to the identity of the channel 64 for the first pass printed according to the example in FIG. 3:

TABLE II

| Channel | Address | SOS Skip |
|---------|---------|----------|
| 0 | 2 | 1 |
| 1 | 4 | 1 |
| 2 | 6 | 1 |
| 3 | 8 | 1 |
| 4 | 1 | 0 |
| 5 | 3 | 0 |
| 6 | 5 | 0 |
| 7 | 7 | 0 |
| 8 | 0 | 0 |

The FIFO line buffer 80 is dual-ported, meaning that image data values can be stepped out of the device to the writing source at a different rate than, and simultaneously as, they are brought in from the interface 70. The buffer 80 has the capacity to hold more than one scan line of data. There is no need to wait until one scan line is emptied before stepping in more data into the buffer 80, so information rarely needs to be communicated back to the RIP 60/parser 62 except in the two cases of inadequate data in FIFO line buffer for printing the next scan line, and FIFO line buffer full. The 8XCLK/byte first counter in channel controller 92 divides the 8XCLK pulses by eight to step image data out of the FIFO line buffer and may never need to be reset except at the start of writing an image. The second bytes/line counter in the channel controller 92 is a bytes/line counter, tallying the image data points clocked out to that channel's writing source is reset by each SOS pulse propagating through the counter 90. A storage register is associated with this bytes/line counter in controller 92 to retain the number of image data points in a scan line, which is changed by sending a new value from the control unit 65 on the communication line terminating in the channel controller 92 as shown in FIG. 4. As the data is read out of FIFO line buffer 80, the contents do not have to be set to zero since in dual-porting the data locations into which subsequent image data from the RIP interface 70 should be placed is known. The contents of the buffer 80 for a laser intended to remain inactive on the last pass is effectively zero either because all data broadcast to it from the parser 62 has already been consumed by clocking pulses during writing by the end of the previous scan causing the buffer 80 to present a zero at its output, or because the running tally of all image data values stepped into the FIFO line buffer 80 equals the tally of all image data values clocked out, in turn resulting in imposition of a zero at the output of the channel controller 92 to its writing source. The SOS skip counter 90 does not perform any differently on the last pass than on any other; each channel 64 discovers that it has no more image data upon reaching the end of its terminal swath as a consequence of routing the interleaved scan line data. Information that the last pass is occurring need not be specifically communicated to the channels 64. The control unit 65 knows the number of scans to reach the end of the imaging area on the image-recording material (and knows the exact number of scan lines encoded by the image data), so that the control unit 65 terminates transmission of 8XCLK pulses and Start-of-Swath pulses (SOS) to the channels 64. Communication of completed printing from the control unit 65 to the RIP 60 or RIP interface 70 is not necessary since both RIP 60 and RIP Interface 70 have opportunities to detect that no more image data is available before the last pass is printed. However, the RIP 60 can send a signal to the control unit 65 that no more data is available, indicating that the end of printing will occur soon, or the RIP 60 will have sent a total scan line count to the control unit 65 at the beginning of printing so that the control unit 65 can detect when the end of printing is imminent.

Changing the interleaving factor k permits changing the raster spacing without necessarily changing the spacing between sources, the magnification, or the tilt angle, although changes are required for the printhead step size and the concordance between raster lines and sources. The number of active channels N may need to be changed in order to be compatible with the interleaving factor k for some interleaving conditions. For instance, if the scan lines exposed by N channels are equally spaced on the image-recording material and if the interleaving factor k evenly divides the number of channels N by a whole integer, then the number of active channels must also be changed. But each of these changes can usually be accomplished electronically without any realignment of the printer.

The address latch 84 in each channel 64 of the electronic control circuit in FIG. 4 is programmable or revisable, over a channel address line by the printer control unit 65. This permits adaptation to different interleaving factors and different numbers of active sources in the printhead as discussed below.

Figure 5:
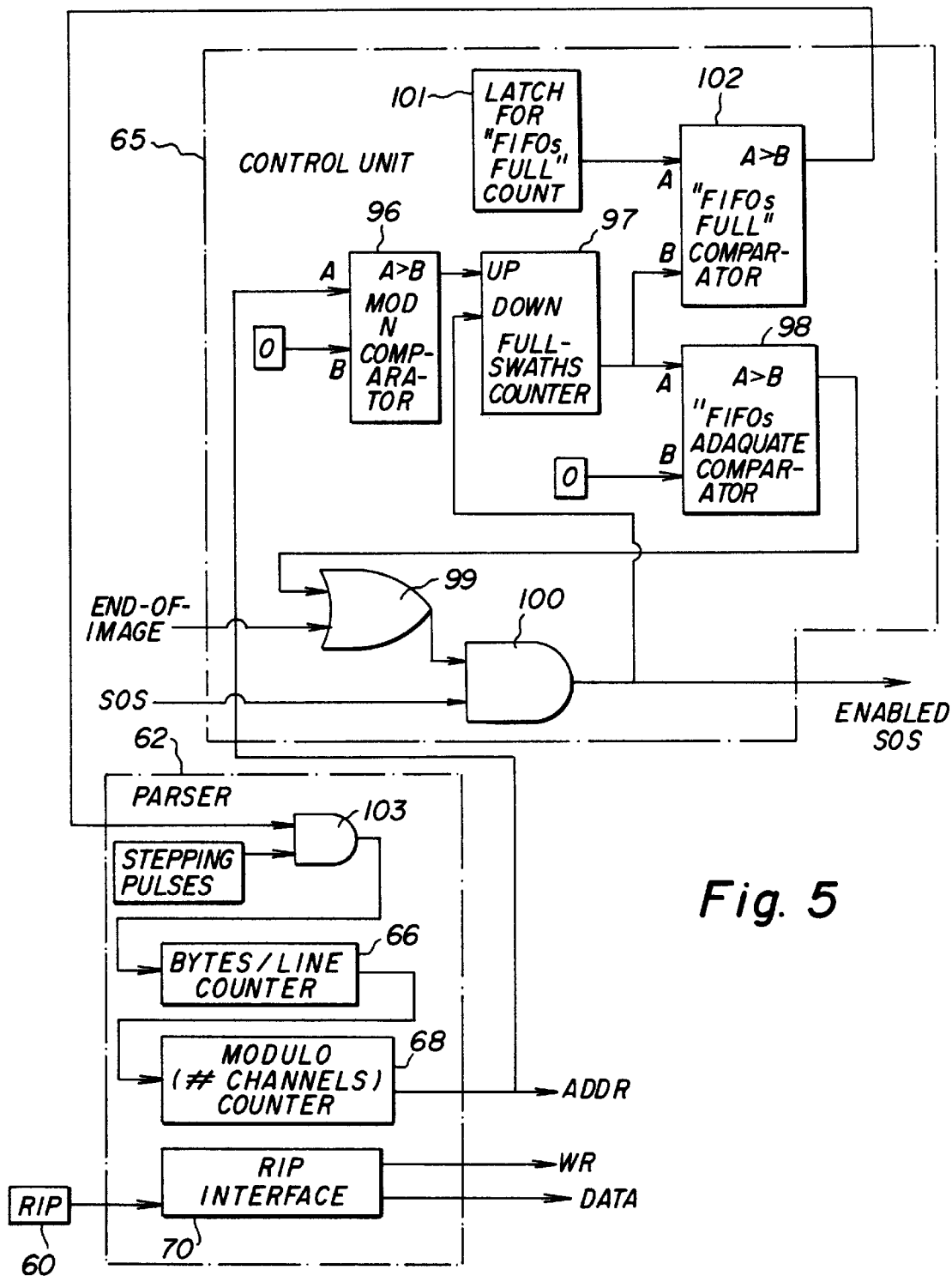
FIG. 5 illustrates a portion of the control unit 65 of FIG. 4 in greater detail.

A section of the control unit 65 shown in FIG. 5 can deduce whether an adequate amount of image data resides in the FIFO line buffers 80 of the channels 64. Each time a group of N image lines have been transferred from the parser 62 to the channels 64, the ADDR output of counter 68 counts up through the numbers 0 through (N−1), then switches to 0 again. These ADDR lines are compared to a 0 causing a Mod N Comparator 96 in the control unit 65 to emit a pulse counted by a full-swath counter 97 while the Nth image data line is being broadcast to the channels 64. This transferral of the Nth data line indicates that enough data is present in the channels 64 to write the first pass if the first line of image data is written at the first available scanline in the filled-in portion of the completed raster. The last source in the array {with source index (N−1)} always exposes Line L(N) on the first pass and integer multiples of N on all subsequent passes. Even though some of the raster lines numbered lower than N are not written on the first pass but are stored in their respective channels for writing on a subsequent pass, if the image data specifying the first N raster lines has been acquired by the channels, then the printer is ready to perform the pass. A FIFO's adequate comparator 98 switches ON since the number of full-swath counts is greater than 0, enabling, through OR gate 99, the Start-of-Swath pulses to pass through the AND gate 100 and proceed to the counters 90 to participate in clocking image data to the writing sources. The actual passage of the subsequent enabled SOS pulse initiating data clocking to the writing sources also decrements the full-swath counter 97, since a pass consumes a scanline of data from each channel 64 for swaths other than the very first one or few and the last one or few that cannot be completely filled in, meaning that it consumes N scanlines of image data in all. If this SOS pulse occurs before another N scanlines of image data have been transferred into the FIFO line buffers 80 eliciting another incrementing pulse from the comparator 96, then the full-swath counter 97 would be displaying a 0 at its output which would turn off the comparator 98 and disable further SOS pulses from reaching the channels to participate in clocking data to the writing sources. The last (k−1) swaths need a special "end of image" signal to enable passage of the SOS pulses through the AND gate 100 because the full-swaths counter 97 will have already counted back to 0. This end-of-image signal might be based upon a signal from the data source such as the RIP 60 or might be generated within the control unit 65 based on knowledge of the total number of scanlines in the image and upon the tally of the number of scanlines already printed. The counts accumulated in the full-swaths counter 97 can also be used to tell whether the FIFO line buffers 80 are full. In preparation for printing an image, the latch 101 for FIFOs full is loaded with the least number of swaths that can cause overflow of the memory of at least one of the channels 64. This value may be retained in a memory, may be computed from knowledge of the storage spaces in each of the FIFO line buffers 80, the number of sources, and the interleaving scheme to be used, or may be set by user-selectable switches. If the number of swaths worth of data remaining in the channels 64 after accounting for consumption by writing passes reaches this preset limit comparator 102 produces a signal which closes AND gate 103, resulting in the parser 60 being prevented from sending more data to the channels by using the AND gate 103 in the parser 60 to cut off the pulses which step the data out of the RIP interface 70 to the broadcast lines to the channels 64.

FIG. 6 illustrates the changes required to convert a printer with 10 sources spaced 20 μm apart from operation at a raster spacing Y=10 μm with interleaving factor (k=2) using only 9 of the 10 possible sources (since 2 is an integer divisor of N=10 but not of N=9) to operation at raster spacing Y=6.7 μm with interleaving factor (k=3), using all N=10 sources (since 3 is not an integer divisor of N=10). On the first pass, only sources 6 through 9 are activated to write scan lines 1, 4, 7, and 10, respectively, as indicated by inspection of FIG. 5 and the following Table III:

TABLE III

| Channel | Address | SOS Skip |
|---------|---------|----------|
| 0 | 3 | 2 |
| 1 | 6 | 2 |
| 2 | 9 | 2 |
| 3 | 2 | 1 |
| 4 | 5 | 1 |
| 5 | 8 | 1 |
| 6 | 1 | 0 |
| 7 | 4 | 0 |
| 8 | 7 | 0 |
| 9 | 0 | 0 |

The printhead steps 66.7 μm to enable sources 3 through 9 to transfer dye on the second pass. The printhead steps 66.7 μm again to enable all of the sources to transfer dye, completing the raster at the leading edge of the image on this third pass. The concordance in Table IV below specifies the source responsible for exposing the raster line and the printhead pass during which this is accomplished for the example in FIG. 6:

TABLE IV

| On Pass 1: | On Pass 2: | On Pass 3: |
|------------|------------|------------|
| Source 0 prints nothing | | |
| Source 1 prints nothing | | |
| Source 2 prints nothing | | |
| Source 3 prints nothing | | |
| Source 4 prints nothing | Source 0 prints nothing | |
| Source 5 prints nothing | Source 1 prints nothing | |
| Source 6 prints Line 1 | Source 2 prints nothing | |
| Source 7 prints Line 4 | Source 3 prints Line 2 | |
| Source 8 prints Line 7 | Source 4 prints Line 5 | Source 0 prints Line 3 |
| Source 9 prints Line 10 | Source 5 prints Line 8 | Source 1 prints Line 6 |
| | Source 6 prints Line 11 | Source 2 prints Line 9 |
| | Source 7 prints Line 14 | Source 3 prints Line 12 |
| | Source 8 prints Line 17 | Source 4 prints Line 15 |
| | Source 9 prints Line 20 | Source 5 prints Line 18 |
| | | Source 6 prints Line 21 |
| | | Source 7 prints Line 24 |
| | | Source 8 prints Line 27 |
| | | Source 9 prints Line 30 |

All passes subsequent to pass three activate all the sources until the end of the slow scan is reached and then sources indexed 7 through 9 are inactive on next-to-last printhead pass as can be inferred from the incomplete raster on the right edge of FIG. 6 and sources indexed 4 through 9 are inactive on the last pass to complete the raster in the imaging area.

Values for the interleaving factor of k=2 or k=3 are preferable because the precision of raster spacing Y must be maintained regardless of the interleaving factor. Assume that spacing variation of 1 μm is barely visible for the 10 μm raster written in FIG. 3, i.e., a 10% line spacing variation is tolerable. The sources are 20 μm apart when interleaved by a factor of k=2 to write the desired raster, but the spacing between sources must be maintained at equal spacing within 1 μm to attain the specification for the raster, i.e., a 5% source spacing variation. If interleaving by k=3 is performed with sources 30 μm apart to produce the 10 μm raster, the limit on source spacing variation is only 3%. Increasing the interleaving factor worsens the tolerance on fractional source spacing variation.

As can be seen from the above discussion each data channel 64 includes storage 80 for at least the datum being printed, its own revisable address register 84, and an address-value-recognition device 82, which is permanently associated with one of the independently modulatable sources (lasers) of the multiple-source printhead. The decision for routing or distributing the data is made in each data channel 64 rather than in a central image storage device or in the image source. The data source need not retain information to direct each scan line to a specific data channel and need not allocate portions of its memory to specific printhead elements, but does display or output an address value based upon the index of the scan line to be transmitted. The data source transmits the image data to all of the channels 64 simultaneously, and each channel 64 decides which image data to retain and which to ignore.

The responsibility of specific writing elements of a multiple-source printhead to write certain scan lines need not be imposed at the time of manufacture of the printer. The data source, such as a framestore, need not generate the index of the data channel intended to write a specific scan line. No entity, other than the data channel 64 itself, needs to participate in directing each scan line to the appropriate data channel during the course of writing. The interleaving factor can be changed electronically by sending new address values for loading into the revisable address register 84 of each data channel 64, so that the spacing between raster lines or the number of writing spots used can be changed without mechanically modifying the printer and without changing the algorithm for apportioning scan lines to the appropriate data channels 64. The data source or main storage can retain and transfer data in ordinal order as if the image were to be written by a printhead containing only one source.

Data channels 64 have adequate capacity to hold the data representing entire scan lines whose printing must be delayed in order to accomplish the desired interleaving and to hold the data for pixels within a scan line whose printing must be delayed due to tilt of the printhead. Some channels can have smaller data capacity than others, as long as the address assignment implemented by the interleaving takes this into consideration and assigns addresses requiring greater data capacity only to channels containing adequate capacity. The main storage need only contain enough data to span the duration between display or output of a channel address value and the instant when the intended data channel is ready for datum transfer to begin. In favorable circumstances, the storage in interface 70 could simply be a single buffer holding the most recent datum received from the data source (RIP 60) for broadcast to the channels 64 and a storage for the address value based upon the raster-line index of the scan line to which that datum belongs; while any channel known to not require any delay of scan lines could be a single storage location holding the collected datum for immediate writing and an address-value-recognition device, and other channels could contain memory sufficient to retain their requisite number of scan lines and an address-value-recognition device.

Storage 80 in the data channels 64 is preferably composed of electronic first-in:first-out buffers (FIFO's). This type of memory has become sufficiently inexpensive that fabricating all channels identically to have adequate capacity for several scan lines to accommodate delay of unwritten lines required for interleaving and delay of several data values within one scan line necessitated by printhead tilt incurs less expense than specially designing different channels with different capacities to maximize memory usage. Identical channel composition simplifies adaptation to an increased number of sources in the printhead because only the address assignment procedure needs to be notified to take into account a different number of sources. The channels 64 for the added sources could simply be plugged in to the communications lines from the Control Unit 65 and from the Parser 62.

The magnification and the tilt angle of the head can be changed if desired to make adjustments to the raster spacing. Interleaving allows the tilt angle to remain small so that the tilt-induced artifacts are tolerable.

An array of multiple sources for a printhead must be fabricated with the sources sufficiently closely spaced so that no unprinted spaces remain between scan lines in regions of the image intended to receive the highest exposure upon completing the printing of a document to be able to render the full tonescale. For example, the centers of typical sources with Gaussian profiles characterized by standard deviation radii $\sigma_{source}$ are typically spaced less than 5 $\sigma_{source}$ apart if tilting is the only method of achieving overlap. A portion of the energy activating each source is usually converted to heat which can diffuse to the neighboring source, affecting the neighbor's emission. In laser arrays, this thermal cross-talk usually decreases a neighbor's emitted light because temperature elevation increases the threshold current for the transition from less efficient spontaneous emission to stimulated emission. In resistor arrays, this thermal cross-talk might make a neighbor seem more energetic than specified by the source image data because the diffused heat will increase the neighbor's temperature applied to the donor.

Discontiguous thermal printing, as discussed above, can accommodate more widely spaced sources, reducing the amount of heat diffusing to a source's neighbors and the ensuing artifacts.

Printers using multiple sources can produce images containing artifacts caused by interactions among the writing spots. The heat deposited by one writing spot in a donor sheet for thermal printing can overlap or can diffuse to the location to be written by a second source, causing the second source to transfer more dye than specified by the source image data. Spacing the writing spots farther apart or increasing the time delay between writing at one location and at its neighboring locations can reduce the interaction and minimize artifacts. Tilting may not eliminate thermal-printing artifacts; the tracks of neighboring writing spots may overlap with sufficiently short temporal delay that residual heat or thermal diffusion significantly elevates the donor's temperature above ambient and causes subsequent writing spots to transfer more dye from the donor than anticipated.

Interleaving while using a constant printhead step size allows use of writing spots spaced farther apart than the distance between neighboring lines in the image, and increases the temporal spacing by one or more line-writing times between exposure of neighboring raster lines on the document. Interleaving using a constant printhead step size is suitable for artifact reduction in even the most demanding case: multiple-laser thermal printing for both continuous tone and halftone. This interleaving method can be implemented with on-the-fly screening of halftones by the RIP 60 supplying the ON-OFF image data specifying the binary modulation of the writing sources to the Parser 62 and Channels 64 of FIG. 4.

Writing spots can exhibit optical cross-talk. Writing spots derived from a single laser or from mutually coherent lasers can exhibit undesired interference patterns in regions where the light from more than one writing spot overlaps at the same instant. Avoiding this simultaneous overlap of neighboring raster lines by writing neighboring raster lines on different printhead passes eliminates this optical cross-talk.

Discontiguous thermal printing can transfer dye more thoroughly from regions of the donor intended to be devoid of dye, called "clean-out", than writing with a tilted printhead with overlapped writing spots is able to transfer. The tilted printhead must transfer all of the dye from a region in a single swath or pass, so the writing spots need to overlap significantly to ensure dye transfer midway between neighboring scan line centers. If round sources in the tilted printhead are spaced by $5\sigma_{source}$ of their emission patterns and tilted at 66° to overlap their tracks at their writing spots' $1\sigma$ irradiances, then the center of a track near the array center may be exposed to more than 5% of a writing spot's maximum irradiance for longer than the time required for the writing spot to scan 12 times its $\sigma$ by the overlapping neighbors. In addition the surrounding material is hot, retarding cooling by thermal diffusion. This increased length of time that a location remains hot might be sufficient to enable the heat diffusing to the support to cause melting, disfiguring the support's surface and dissolving some of the dye so that further exposure is unable to transfer that dye. Areas intended to be "cleaned out" might have residual density and engender diffraction due to the furrowed surface and remnant dye when written with a tilted overlapping printhead.

Discontiguous thermal transfer deposits all of the energy for transferring dye from a location in the donor within the brief time the writing spot needs to traverse a distance approximately equal to four times the spot's $\sigma$. The amount of dye transferred depends upon the exposure energy deposited at that location in excess of the threshold needed to raise the visible dye to its vaporization temperature when using light beams to remove dye from a donor. The heat required to attain the threshold diffuses into the surrounding dye layer and the nearby support. The profile of elevated temperatures in the vicinity of the narrow scan line quickly declines monotonically because it is surrounded by much cooler material. By the time that the neighboring raster line is exposed during a subsequent swath, the donor's temperature has decayed back to ambient temperature. A typical temporal interval of about 60 msec between successive exposures at the same location with interleaving in a graphic arts application is appropriate, although exposure events separated by only about 14 $\mu$sec may be possible with a slight attendant risk of thermal interaction in spite of interleaving.

Tilting the array reduces the spacing between writing spots while allowing adherence to a minimum source spacing. But tilting transforms a deviation of the writing spots from a plane into spot-spacing variation. This spacing variation enlarges more rapidly than increasing tilt angle. One way for an array of multiple sources to deviate from a plane is to bow the array, called a "smile". Several mechanisms may cause the array of multiple sources to become curved.

The array may be fabricated on a curved substrate. The array may be connected at its ends to a support with the distance along the support between these connection points shorter than the array length causing the array to form a curve so that this curvature is maintained upon completion of the mounting process. The array may be connected at its ends to the support when both array and support are flat, but a temperature increase may cause an array with greater thermal expansion coefficient than the support to bow above the support. The array itself may change temperature differentially between its top and bottom surfaces upon supplying energy to activate the sources for printing, causing the array to bow. The orientation of a bowed array 110 of multiple sources 112 with respect to the scanning direction can aggravate the variation in spacing between dye-transfer tracks, as illustrated by FIG. 7(a) and 7(b). The least variation and the most symmetric track spacing occurs when the arc is not tilted with respect to the fast-scan direction as illustrated in FIG. 7(a). Tilting the arc causes the tracks at one end of the array to be closer together than the tracks written by the center of the array, and to be much closer than those written by the other end of the array as illustrated in FIG. 7(b). The ability to write with an untilted array by using the interleaving of the present invention increases the tolerance of the printer for "smile" in its multiple-source printhead.

When writing a line that is perpendicular to the fast-scan direction with a tilted printhead, each writing element must be activated at a different time to generate a straight line in the completed image. The circular writing spots 114 in FIG. 8(a) produce a very small amount of "scalloping" 116 that is identical to the line edge written by an untilted printhead if the activation timing is correct. FIG. 8(b) illustrates the undesired artifact obtained by tilting a non-circular writing spot 118, such as an elliptical writing spot, at an angle with respect to the fast-scan direction. The principal artifact of the elliptical spot depicted in FIG. 8(b) is the ragged edge 119 occurring at abrupt image-density transitions along the scanning direction, such as at an edge of an object in a picture. Similarly, multiple peaks within the energy profile of an individual writing spot along the direction perpendicular to the line of centers of the sources might produce streaks at any location in the image oriented along the fast-scan direction when writing with a tilted printhead. The ability to print small raster spacings with untilted printheads comprising more widely spaced sources by interleaving permits use of non-circular writing spots which have higher power density affording faster writing speeds or which can be more inexpensively produced than circular writing spots.

Figure 9A:
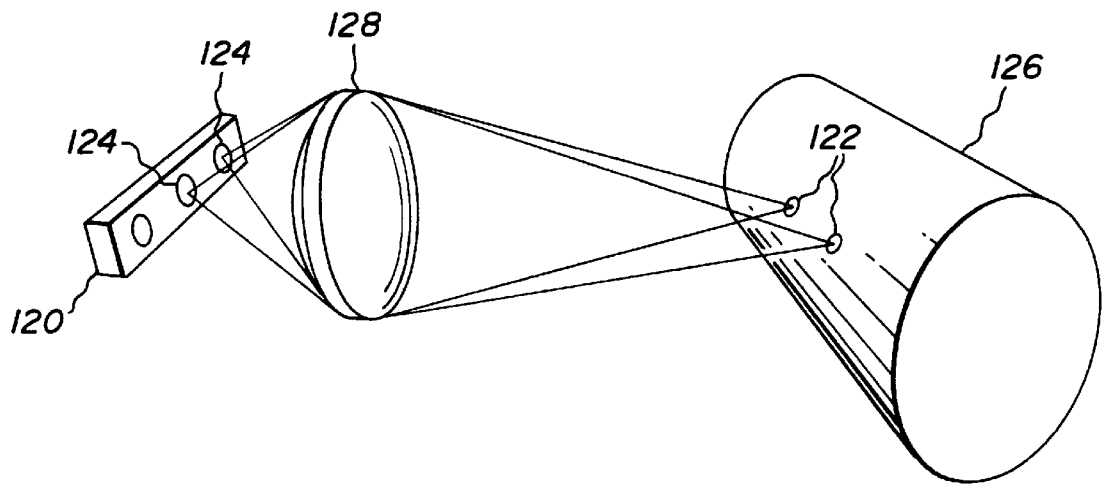
FIGS. 9(a) and 9(b) illustrate a multiple-source printhead focused by the lens at the center onto a convex rotating drum surface at the right in which the array is untilted with respect to the drum rotational axis and, therefore, to the fast-scan direction of the document in FIG. 9(a), while the array is tilted with respect to the drum rotational axis and to the fast scan direction in FIG. 9(b)
Figure 9B:
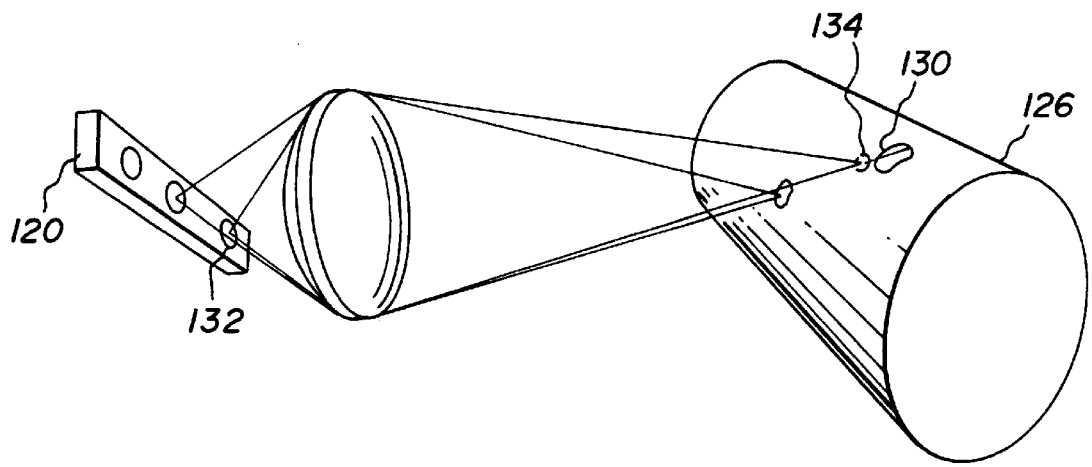

FIG. 9(a) shows a tilted linear array 120 at left and the focused images 122 of array sources 124 of the array on a convex cylindrical drum surface 126 at right. When the flat focal plane of the imaging lens 128 coincides with the drum surface along a line parallel to the drum's axis of rotation, the smallest writing spots are obtained with uniform size when the printhead array is untilted with respect to the fast-scan direction. In FIG. 9(b), the tilted printhead 120 is positioned so that its central element is focused on the drum surface. But the tilting combined with the drum-surface convexity causes the image of an element 132 near the printhead's periphery to be focused in an aerial image 134 before it reaches the drum surface, producing a larger writing spot than desired, as indicated by its enlarged footprint 130 near the upper right of the drum surface. This spreading of the writing spot causes lower exposure and less dye transferred by sources away from the center of the printhead. The ability of the discontiguous printing of the present invention to print with minimal printhead tilting allows reduction of this defocusing and image density variation among the writing spots.

If some printhead tilt is used during printing, the most defocused writing spots will also strike the document some distance from their anticipated location due to the separation of the drum surface from the focal plane as shown in FIG. 9(b). Adjustment of the data delay in the circuit of FIG. 4 for the individual channels by the amount that each departs from its anticipated position can compensate for this interaction of tilt with drum curvature to produce straight lines in the image perpendicular to the fast-scan direction. This delay might require re-adjustment if the plane of best focus is moved with respect to the drum surface. The adjustment of the delay to accommodate printhead tilt and possible additional spacing due to the drum surface receding from the image plane of the lens in FIGS. 9(a) and 9(b) can be accomplished by inserting a specified number into the counter 88 prior to initiating each printhead pass. The "8XCLK" oscillates 8 times at constant rate within the period for scanning the length of one subpixel in a graphic arts printer, so that the light source's transition from the power directed to one subpixel to the power for the subsequent subpixel can be changed at any of 8 equally spaced locations within the subpixel's length on the image-recording material. Upon initiation of each printhead pass, the "8XCLK" must first count down the number pre-set in that channel's counter 88 before the "8XCLK" pulses will be passed through to the controller 92 to clock out pixel data to the light source. If the number "0" were placed in the counter 88, the first "8XCLK" would produce a transition at the timing input to the controller 92, inducing appearance of the first pixel's data value at the channel controller output coincident with that first "8XCLK" at the top of the image-recording area as would be appropriate for the source at the far end of the printhead corresponding to the writing spot 130 at the near end of the drum for counterclockwise rotation of the drum in FIG. 9(b). The greater the number inserted in the counter 88, the longer the delay before that channel's data would be sent to its associated light source. If a value of 26 were inserted in the counter 88, the first pixel data would not be presented at the output of the channel controller 92 until the image-recording area had moved three full subpixels of 8 "8XCLK" pulses each, plus another quarter of the fourth subpixel contributing another 2 "8XCLK" pulses, as might be appropriate for the writing spot at the center of an image-recording material mounted on a counterclockwise-rotating drum. The specific delay value for each channel 64 can be communicated to that channel's counter 88 by the printer control unit 65; alternatively, the delay value might be generated by special-purpose circuitry within the channel 64 but this option is not shown in FIG. 4. The delay values can be determined with knowledge of the printhead tilt, the index of the source in the printhead, optical magnification from sources to writing spots, the drum rotation rate, and the drum circumference, or can be generated by writing a test pattern by pulsing all sources simultaneously, then measuring the deviation of the line or arc in the resulting image from perpendicularity to the fast scan direction. Suitability of the chosen values can be checked by inspection of the image exposed by attempting to write a line perpendicular to the fast scan direction while exposing an image-recording material.

The present invention can also be used with continuous tone printers by substituting a code value map for the bit map such that each code value indicates an intensity level which is used to drive the emission of the laser source.

Figure 10A:
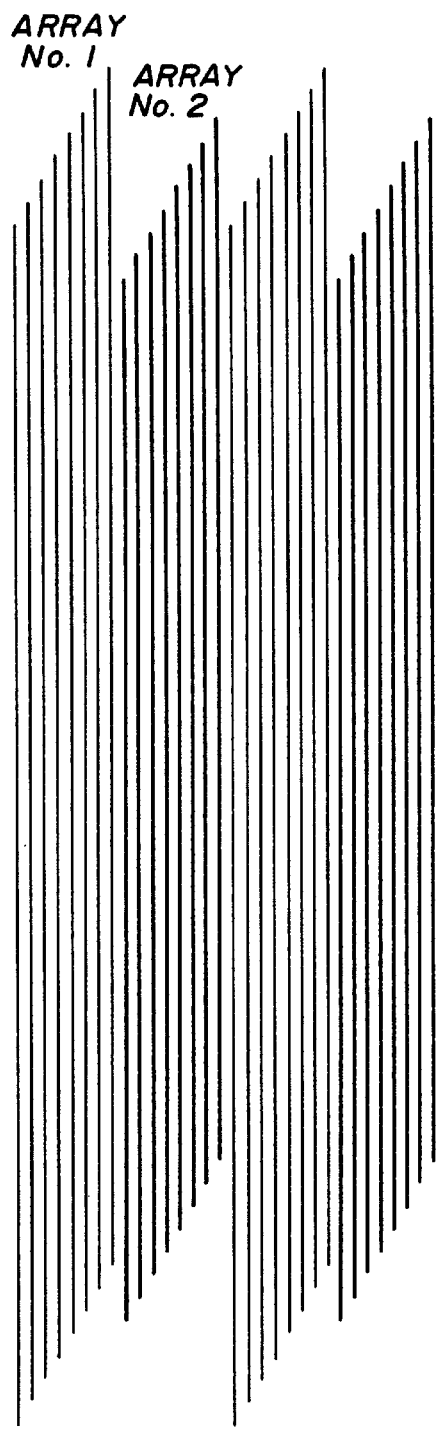
FIGS. 10(a) and 10(b) illustrate printhead interleaving showing the visible difference between image sections written by two printheads generating different amounts of image density in FIG. 10a, and obscuration of this difference in FIG. 10b by interleaving scan lines written by these two arrays.
Figure 10B:
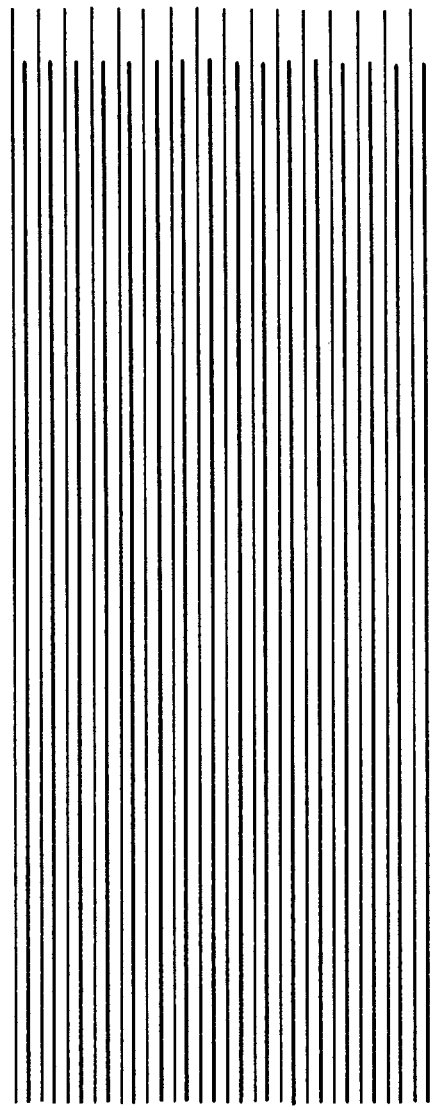

More than one multiple-source printhead can be used for printing a document by thermal-dye transfer. Interleaving scan lines from the several multiple-source printheads avoids artifacts due to thermal interactions and allows operation at the lowest printhead angle, while affording the additional desirable feature of obscuring differences in the amounts of dye transferred by the different printheads. Variations in printhead manufacture or adjustment can cause differences in the emitted power, writing-spot size, or source spacing among printheads, causing the different printheads to transfer differing amounts of dye. FIG. 10(a) illustrates the consequences of printing a supposedly uniform region with two printheads, in which the sources of one printhead transfer dye from a broader stripe in each scan line than the sources in the other printhead do. Each printhead is tilted appropriately to print all of the scan lines in its own segment of the image, with the difference between printheads causing the easily visible light and dark regions of a pattern that is intended to be uniform. Reducing the printhead tilt and interleaving scan lines from the two printheads by k=2 eliminates the broad light and dark segments to obtain a uniform-appearing pattern by rapidly alternating light and dark scan lines in FIG. 10(b).

Sources producing different colors in the image can be interleaved to avoid thermal interaction among sources responsible for generating the same color or among sources responsible for generating different colors. Multi-color dye donor elements suitable for obtaining more than one color in an image by laser-thermal-dye transfer are described in U.S. Pat. Nos. 5,234,890; 5,234,891; and 5,240,900. Transfer of different colors in the image can be attained by dyes absorbing different wavelengths. But since the absorbed power is converted to heat to transfer the image dye regardless of the absorbing wavelength, thermal interaction of the heat produced by absorption of light intended to transfer one color of image dye might indiscriminately transfer the image dye of another color, producing color contamination. Thermal interaction between overlapping scan lines intended to transfer dye of the same color engenders high temperatures between the scan lines causing indiscriminate transfer of dye of another color. Interleaving the scan lines reduces the thermal interaction, promoting the desired color purity when printing the image.

Pixel replication, described for example by Anil K. Jain in *Fundamentals of Digital Image Processing*, Prentice Hall, Englewood Cliffs, N.J. (1989) pp. 253–255, can be used with the interleaving of the present invention to produce a printer capable of switching between several image resolutions implemented by all-electronically without physical manipulation of the printhead, tilt angle, optical magnification, or pagescan translation speed. For instance, the printing of FIG. 3 interleaved by k=2 produces a completed raster with 10 μm scan line spacing, conferring the ability to print an image at a resolution of 2540 pixels per inch. Replicating each pixel twice, i.e., replication factor R=2, enables the printer to produce an image consisting of 1270 pixels per inch, while triple replication, i.e., R=3, prints the image at 847 pixels per inch. Since the sequence for printhead channels writing scan lines on the image-recording material is unchanged whether or not pixel replication is being performed, the SOS Skip count in counter 90 for each channel 64 when implementing pixel replication by any of the following methods remains the same as when not implementing pixel replication for the same number of sources N and the same interleaving factor k.

A discussion of pixel replication with respect to interleaving is facilitated by making a distinction between the image data line with index "I", numbered starting with 1 for the first line in the image, and the scan line with index "L", numbered starting with 1 for the first raster line printed by a single channel on the image-recording material. Pixel replication requires that the same data constituting image line I be printed in clusters of R neighboring scan lines L in the completed image. Interleaving demands that nearest-neighbor scan lines not be printed during a single pass "P" of the printhead. Pixel replication can be accomplished by making (R−1) copies in succession of each original data line in the data source, in the RIP 60, or in the RIP interface 70 (see FIG. 4).

Copying data and its memory requirements can be avoided while interleaving by rebroadcasting each line of image data from the RIP interface 70 a total of R times while stepping through the sequence of addresses for their destination channels based upon the indices L of the scan lines in the document expressed as modulo (the number of channels N). In other words, the address of each of the R rebroadcasts is determined from the scan line to be written according to {L mod [N]} just as in the absence of pixel replication.

During operation the printer is transferring the image data for a complete scan line to one channel before beginning transfer of the next scan line, and the buffer in the RIP interface 70 reads out each scan line R times. The buffer only steps out G image data addresses encoding the scan line currently being transferred, in which G is the number of image data values in one scan line, while holding all other image data in place. This can be accomplished by using pointers within the buffer or by breaking the buffer in the RIP interface 70 into two parts, a storage area of G locations for the scan line currently being broadcast and a storage area for any subsequent scan lines acquired from the RIP 60.

In the two part buffer approach, a copy of the currently transmitted image data value is sent back to the first storage location of this G-length buffer while stepping through the entire scan line (R−1) times. During the Rth broadcast, the image data values for the next scan line are permitted to be stepped into the G-length buffer while the image data values for the present scan line are being stepped out to a channel 64 for the last time. A counter (not shown) keeps track of the number of rebroadcasts within the precision of one subpixel and a switch allows the copying to the input of the G-length buffer on the first (R−1) broadcasts but not on the Rth broadcast. In this situation, the printer must print R scan lines in the time that the RIP 60 transfers one scan line to the RIP interface 70 on average in order to not need a buffer nearly as large as a full frame store. The RIP 60 needs to transfer data more slowly than typical when printing with pixel replication or the RIP Interface 70 needs to send "handshake" signals to the RIP 60 when more image data can be accepted. If pointers are used with only one memory to implement pixel replication, a counter is needed to keep track of the address of the image data being transmitted. When the last image data value is reached, the pointer reverts to the address of the first image data value to accomplish the re-broadcast with no increase needed in data storage. This counter also determines when R total replicates of this scan line have been transmitted, so that the pointer can be advanced to the address of the first image data value of the next scan line and that the storage formerly occupied by the most recently transferred scan line is available to be overwritten by more data from the RIP 60. If the RIP Interface 70 transfers an image data value for each of N sequential scan lines before transferring the next image data value for the initial scan line, permitting the smallest possible storage for the RIP interface 70 and for the FIFO line buffers 80 when printing without pixel replication, then re-broadcasting will require (N×R) lines of G storage locations in the RIP interface 70 to allow copies of the scan lines to be made in the interface 70 prior to broadcasting any of them. This transmission of single image data values is, however, not preferred for pixel replication.

The counter associated with the RIP interface 70 in the parser 62 and which counts through R, indicates when the G image data values for each of R broadcasts are complete, so that the pointer in the buffer of RIP interface 70 can be reset to the address of the first image data value of the subsequent scan line, in the case where pointers are used in one memory instead of splitting the memory into two physical parts. When using pointers, the R counter could have a subsidiary counter counting up to G image data values in each line, communicating attainment of the end of each rebroadcast of a scan line to the R counter. If a two-piece buffer is used simply counting to {(R−1)×G} for copying the buffer output to the buffer input, then using the same counter to count to G for the uncopied broadcast and stepping in the next scan line is sufficient.

The transfer of image data to the channels can be performed faster when interleaving with pixel replication by presenting or outputting more than one address to the channels 64 by the counter 68 in conjunction with a single broadcast of the line of image data. The number of simultaneously presented addresses should equal the replication factor R. The addresses correspond to all R of the scan line numbers L intended to be printed with copies of the data in image line I. Image data line I spawns scan lines L=[1+{R×(I−1)}] through L=(R×I), so that the addresses ([1+{R×(I−1)}] mod [N]) to ({R×I} mod [N]) are output in conjunction with broadcasting image data line I. Broadcasting with several simultaneous addresses requires some of the channels, for example channel having index 4 when N=9 and R=2, to have storage capacity of at least one scan line more than they would need for performing interleaving without pixel replication because the image data must be captured by all appropriate channels when those data are sent to the channel printing those data earliest in the sequence.

The simplest architecture to accomplish this is multiple address broadcast busses (at least R of them) and multiple address compare's units 82 in each channel 64 with a multiple input OR gate between these address compare's units 82 and the AND gate 86. In this architecture only one channel address latch 84 in each channel and only one DATA bus serving the printer are still required. A single bus with serial broadcasts of the R addresses could also be used, although a flip-flop between the address compare unit 82 and the AND gate 86 is needed and must be cleared at the beginning of the R broadcasts of the addresses in preparation for one scan line's broadcast. This flip-flop retains knowledge of the success of an address compare 82 during any of the R broadcasts of addresses on the single bus, permitting all of the WR pulses to step the image data values for that scan line into the FIFO line buffer 80. All of the R broadcasts of the addresses on a single bus need to be completed before broadcasting any of the data for that scan line. With the single bus, a separate communication line needs to be provided with the ADDR line from counter 68 to each of the address compare units 82 to notify the channels 64 that addresses for a new scan line are to be broadcast, by clearing the address compare flip-flop in each channel 64. The replicated scan lines are nearest neighbors of the original scan line, so the rebroadcast addresses in any case are obtained by counting by one from the original image line I's corresponding raster line [1 +{R×(I−1)}] up to the raster-line index of the final replicate {R×I} as discussed above, and taking modulo N of each of these raster-line indices. The counter 68 built for a printer without pixel-replication has an added conventional arithmetic logic circuit to subtract 1 from the image data index I, then multiply this result by R (a simple leftward shift by one bit for R=2) then add 1 from an additional counter to this result, then compute the modulo N value for this result (simply retaining only the least-significant 3 bits for N=8). A timer is also incorporated in the counter 68 to cause the first address to be displayed for an adequate time to allow the address compare units 82 to determine recognition, then the timer's output pulse increments the additional counter, so that 2 is added instead of 1 to the intermediate result of {R×[I−1]} in the arithmetic circuit to produce the next address to be broadcast. This incrementing and address broadcasting is repeated until the additional counter reaches R, giving the R addresses an opportunity to be recognized by the channels, whereupon the additional counter in the counter 68 is reset from R to 1, the address broadcast would stop and the scan line of image data would be broadcast once, terminating when the counter 66 reaches G to re-initiate the address broadcast with a new value of I.

Conventional arithmetic circuits are incorporated in the Modulo (# Channels) counter 68 to compute the raster line index R and channel address from the image data line index I, and these arithmetic operations can be accomplished by conventional bit-shifting circuits in some instances, as discussed above. Only the bytes/line counter 66 in the parser 62 needs to know the actual number G of bytes in one line to determine the addresses to accompany the image data broadcasts and to know when one scan line has been stepped out and the next scan line is beginning. The RIP interface 70 needs to know the number of bytes per line in order to step out the data correctly or to copy the image data values to the correct location when repeating data broadcasts for pixel replication as discussed previously, but the RIP interface 70 does not need to know the number G of bytes per line to generate addresses to be broadcast to the channels 64.

Image data can be transferred equally fast to the channels when replicating pixels while interleaving by broadcasting the data with a single address, by assigning the same address to all of the R channels responsible for writing the scan lines portraying that image-data line. This configuration is especially convenient when the replication factor is an integral divisor of the number of channels, as, for example, replication by R=3 would be for the N=9 printhead printing illustrated in FIG. 3, since no extra address lines, address comparators, or storage would be needed. In this example, the channels for sources with indices 0,4 and 5 would respond to one address, channels for sources 1,2 and 6 would respond to a second address, and channels for sources 3,7 and 8 would respond to the third address. The address presented by the counter 68 in conjunction with the broadcast of image line I is computed as the image line expressed in modulo (ratio between number of sources and the replication factor), computing the value {I mod [N/R]} since R is an even divisor of N. The appropriate addresses are illustrated in Table V below.

TABLE V

| Channel | Address | SOS Skip |
|---|---|---|
| 0 | 1 | 1 |
| 1 | 2 | 1 |

TABLE V-continued

| Channel | Address | SOS Skip |
|---------|---------|----------|
| 2 | 2 | 1 |
| 3 | 0 | 1 |
| 4 | 1 | 0 |
| 5 | 1 | 0 |
| 6 | 2 | 0 |
| 7 | 0 | 0 |
| 8 | 0 | 0 |

This scheme of several channels 64 responding to the same address with pixel replication could even be used if the number of sources is not an integral multiple of the number of replicated pixels, although each channel 64 would either would need to cycle through a series of addresses stored or generated within the channel 64 or would need to be assigned a new address sent by the control unit 65 in preparation for receiving each scan line of data. To facilitate calculating the address to be output to the channels 64, the mathematical operation of "rounding up" is employed and denoted RoundUpInteger[N/R]. A conventional arithmetic circuit can perform the RoundUpInteger[N/R] or a look-up table ROM can be incorporated containing the result of this computation for all of the likely combinations of N and R to be used with the printer. The arithmetic circuit performing the RoundUpInteger[N/R] calculation or the look-up table ROM could be located within the control unit 65 or preferably within the counter 68 in the parser 62 since the parser 62 needs to know R and N anyway. RoundUpInteger[N/R] is the greatest number of image data lines that must be transferred to the channels 64 in preparation for one swath, resulting in only RoundUpInteger[N/R] different channel addresses being needed to route the broadcast image data values to their destination channels 64. RoundUpInteger[N/R] only needs to be determined once in preparation for printing an image, with the numeric value communicated to counter 68 prior to broadcasting image data to the channels 64. If R is an integral divisor of N, meaning that no fractional remainder is created, then RoundUp[N/R] is simply the integer (N/R). If R is not an integral divisor of N so that the division leaves a remainder, then RoundUpInteger[N/R] is the next integer larger than (N/R) no matter how small that remainder is for integer values of R and N. Using the mathematical operation INT[N/R] from computer-programming languages FORTRAN and BASIC to compute the largest integer contained in the ratio of N to R, the round-up operation can be expressed as:

$$\text{RoundUpInteger}[N/R] = \begin{cases} (N/R) & \text{if } R \text{ is an integral divisor of } N \\ 1+\text{INT}[N/R] & \text{if } R \text{ is not an integral divisor of } N \end{cases}$$

For the case of N=9 channels replicated R=2 times, RoundUpInteger[9/2] is evaluated to be 5. Note that this operation of "rounding up" differs from the operation of "rounding off" in which the ratio of N to R is converted to the nearest integer, i.e., to the next lower integer if the remainder of the division is less than 0.5 but to the next higher integer if the remainder is 0.5 or greater. The counter 68 should present or output an address based upon the quantity {I mod (RoundUpInteger[N/R])} when preparing to transfer image-data line I. Image data lines I=1 to I=RoundUpInteger[N/R]=5 should be broadcast to the channels in preparation for the first pass P=1, image data lines I=(1+RoundUpInteger[N/R])=6 to I=RoundUpInteger[2N/R]=9 should be broadcast in preparation for the second pass P=2, and image lines I=(1+RoundUpInteger[{P−1}×N/R]) to I=RoundUpInteger[P×N/R] should be broadcast in preparation for the Pth pass. The counter 68 keeps track of the index I of the image data scan line being prepared to be broadcast to the channels to produce the address with the aid of the modulo arithmetic circuit already in the counter 68 using the loaded value for RoundUpInteger[N/R] when doing pixel replication instead of N when not doing pixel replication. Addresses should be assigned to the channels according to Table VI, which is based upon the address expression {I mod (RoundUpInteger[N/R])} assigned to the R appropriate channels responsible for printing the scan lines L portraying the image data line I:

TABLE VI

| | On Pass 1 | | On Pass 2 | | On Pass 3 |
|---------|---------|---------|---------|---------|---------|
| Channel | Address | Channel | Address | Channel | Address |
| 0 | 1 | 0 | 1 | 0 | 0 |
| 1 | 2 | 1 | 2 | 1 | 1 |
| 2 | 3 | 2 | 3 | 2 | 2 |
| 3 | 4 | 3 | 4 | 3 | 3 |
| 4 | 1, 0 | 4 | 0 | 4 | 0, 4 |
| 5 | 2 | 5 | 1 | 5 | 1 |
| 6 | 3 | 6 | 2 | 6 | 2 |
| 7 | 4 | 7 | 3 | 7 | 3 |
| 8 | 0 | 8 | 4 | 8 | 4 |

As shown in Table VI channel addresses for each pass change slightly. This is because a new set of addresses must be set in all of the channels 64 in preparation for broadcasting each new image data line I from the parser 62 if the number N of sources is not an integral multiple of the number of R of pixel replications. This resetting of addresses is triggered over the communication line from the bytes/line counter 66 to the modulo (# channels) counter 68 shown in FIG. 4 indicating that the broadcast of a full scan line has been completed. These addresses are preferably stored as a precomputed table in a recirculating FIFO residing in the channel address latch 84 and loaded with its full cycle of addresses by the control unit 65 before starting the image. Alternately, the addresses can be loaded directly into the channel address latch 84 without FIFO by the control unit 65 before broadcast of every image data scan line. In this situation any given channel 64 only responds to one address during the broadcast of one image data scan line, although more than one channel might respond to that same address. Channel 4's second address is brought into position for use by the address compare unit 82 between broadcasts of two successive image data scan lines, so that the address compare unit 82 and channel address latch 84 combination does not need to recognize two addresses simultaneously for one channel with this configuration. When the number of sources is not an integral multiple of the number of replicated pixels, some channels may need to have storage capacity for at least a scan line more than they would have required if performing interleaving without pixel replication. In the example in FIG. 2, the image data lines I=1 and I=5 must be acquired by channel 4 in preparation for the first pass because image data line 1 will be written by channel 4 while image data line 5 will be written by channel 8 on the first pass. Channel 4 will write image line 5 on the second pass, but the data for image line 5 was only broadcast in preparation for the first pass to accommodate channel 8's need. Therefore, channel 4 must possess an extra scan line's worth of storage to acquire data both for image line 1 and for image line 5 when it is broadcast soon after image line 1 in preparation for the first pass, then write image line 1 on the first pass while retaining image line 5 to be written on the second pass. Channel 4 must also toggle its address from a value of 1 to a value of 0, possibly by cycling a list of addresses stored in a recirculating FIFO memory located within the channel and loaded initially by unit 65 and stepped into position by the signal from counter 68 indicating that a new line is ready to be broadcast. Alternately, the address may be reset by the controller 65 external to the channel 64 at the transition between the broadcasts of image line 1 and of image line 5 in preparation for the first pass. In preparation for the second pass, channels 5,6,7 and 8 require revision of their addresses by stepping through the addresses as described above. Addresses can also be assigned again to channels 0 through 4 although these addresses will not change from their most recent values. Notice that no image line having address 0 will be broadcast in preparation for the second pass, so that channel 4 will have received two scan lines of data in preparation for the first pass but none in preparation for the second pass, causing channel 4 to accumulate only as many scan lines as any other channel over many passes. The Start-of-Swath (SOS) Skip count of counter 90 remains the same for channel 4 as when not implementing pixel replication because only enough clock pulses are received to step out image line 1 from channel 4 during the first pass, positioning the first pixel of image line 5 to be written by channel 4 at the start of the second pass. In preparation for the third pass, addresses must be revised for channels 0 to 3. Channel 4 retains its previous address of 0 to acquire the scan line of data during broadcast of image data line I=10, then must be revised to its new address of 4 in anticipation of acquiring the data broadcast for image line I=14.

Pixel replication can be performed along the fast-scan direction in conjunction with interleaving in the page-scan direction, possibly to maintain pixels square in the final image or to correct for anamorphic distortion induced during creation or during processing of the image. Replication can be accomplished in the data source, in the RIP 60, in the RIP interface 70, or during broadcast from the RIP interface 70 to the channels by adding the required number of repetitions of each pixel to the data for each scan line.

The expense and complication of increased image storage can be avoided while performing pixel replication in the fast scan direction by modifying the stepping of pixels through the FIFO line buffer 80 and channel controller 92. An example will be discussed for the case of the fractional pixel clock operating at eight times the data rate for writing without pixel replication. This value of eight can be changed to any other value which is suited to the requirements of the printing system for control of delay of printing by the channels with respect to one another. When replicating the pixels by factor R, a counter and latch circuit which counts R pulses and resets to count again can be added to the circuitry generating the 8XCLK stream or added to the SOS delay counter 88 which can be instructed to only transmit one pulse for each group of R of the 8XCLK pulses. However, eliminating some of the 8XCLK pulses impairs the ability to equalize the delays among channels 64 to reproduce straight edges in the image perpendicular to the fast-scan direction. The preferred arrangement for implementing pixel replication in the fast-scan direction is to incorporate 8×R counter circuitry in the channel controller 92 that can be instructed to issue pulses stepping through pixel data from the FIFO line buffer 80 in response to selectable sizes of groups of 8XCLK pulses by counting down the preset number of 8XCLK pulses representing the delay for the first pixel written in that channel's scan line, then stepping out the datum for each subsequent pixel upon accumulating each group of 8R pulses of the 8XCLK clock. During operation and prior to beginning the printing of the image, the value of R would be communicated from the control unit 65 to a latch associated with the 8×R counter. After satisfaction of the SOS skip counter 90, the 8×R counter accumulates (8×R) of the 8XCLK pulses passing through the SOS delay counter 88, issues a pulse to clock out one image data value to the writing source, and resets the 8×R counter to begin accumulation of another (8×R) of the 8XCLK pulses.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, the preferred embodiment uses address register contents to match the address of data output to the channels to route or distribute the data to the proper channel. However, other routing approaches are possible. For example, one possibility of a complementary construction of an address value would be to generate a number which produces a "sum" of 0 and a "carry" bit of 1 when added to the channel-address value held in the address register of the intended writing element. An example of complementarity would be an address value of "3" loaded in the data-channel address register and an address value of "5", displayed by the data source when scan line data is going to be transferred to that data channel. Summing of the data-channel address value and the data source's displayed address value in an octal adder capable of representing only numbers between 0 and 7 would produce a 0 at its sum output and a "1" at its carry output. The "0" at the sum output would be interpreted by the data channel as the indication to gather that datum.

This present invention could also be used as a reader, such as a scanner, that has multiple detection sites each connected to its own data channel. Some aspects of the sequence for data transfer proceed in reverse order as compared to printing. The measurements acquired by a single detector at successive observation positions can be placed in storage locations in the data channel 64 connected to that detector, then readied for transfer to the data collator (the analog of the printer's main storage). The data collator outputs the address value constructed from {L modulo N} for the scan line to be collected; the only data channel discovering a match between the address value held in its address register and the data collator's displayed address sends its scan line to the data collator. As with the printer, the spacing between detected lines can be accomplished without mechanically modifying the reader. Changes of the interleaving factor, shift of the scan lines, change in the number of active detectors in the reader, and tilting of the multiple-detector reading head can be accommodated.

Reference Number List

L1–L30 Print line
0–9 Sources
10 Printhead
12 Source array
14 Lasing region/source
16 Laser beam
18,20,22 Lenses
19 Diffractive optical element;
21 Slit aperture 24 Writing spot
26 Donor
40 Exposure profile
42 Exposure threshold for transfer
44 Exposure in excess of threshold
46 Depleted region
48 Region of no dye transfer
60 Raster image processor
62 Parser
64 Source channel
66 Bytes/line counter
68 Modulo-N counter
70 RIP interface
80 FIFO line buffer
82 Address comparator
84 Channel address latch
86 AND gate
88 Delay counter
90 Start-a-Swath Skip counter
92 Channel controller
96,98,102 Comparator
97 Counter
99 OR gate
100,103 AND gate
101 Latch
110 Arcuate array
112 Sources
114 Circular sources
116 Minimally scalloped image transition
118 Elliptical sources
119 Ragged image transition
120 Linear array
122 Writing spot projected by source on recording material mounted on drum surface
124 Sources
126 Drum
128 Lens
130 Writing spot defocused by departure of drum surface from lens's plane of best focus
132 Source at periphery of tilted array emitting light producing writing spot defocused due to drum curvature
134 Aerial image of source not coincident with image-recording material due to drum curvature

What is claimed is:

1. A thermal printing method, comprising the steps of:
performing a first scanning pass over a donor material with a thermal radiation source, thermally irradiating the donor material using thermal radiation source and creating spaced apart first tracks in the donor material; and
performing a second scanning pass over the donor material with the thermal radiation source, thermally irradiating the donor material using the thermal radiation source and creating spaced apart second tracks in the donor material where the second tracks are in-between the first tracks.

2. A method as recited in claim 1, wherein the first tracks have a first exposure profile spatially overlapping a second exposure profile of the second tracks, the overlap being produced during the second pass.

3. A method as recited in claim 1, wherein the first scanning pass creates the first tracks with exposure profiles that do not spatially overlap, and wherein the method further comprises providing the donor material with an activation threshold and maintaining the donor material between the first tracks at a temperature below the activation threshold.

4. A method as recited in claim 1, further comprises the step of using a printhead and wherein the first and second scan passes are performed with the printhead having a thermal energy writing spot spacing greater than a spacing between one of the first tracks and a nearest one of the second tracks.

5. A method as recited in claim 4, wherein said printhead has a step size making the first and second tracks contiguous.

6. A method as recited in claim 1, wherein the first pass and the second pass do not thermally interact.

7. A method as recited in claim 1, wherein the first tracks are discontiguous with regions of no dye transfer therebetween.

8. A method as recited in claim 1, wherein the first and second tracks have a thermal exposure profile that does not temporally overlap.

9. A method as recited in claim 1, further comprises the step of using different multiple source printheads and wherein the first and second scanning passes use the different multiple source printheads.

10. A method as recited in claim 1, wherein said means for scanning and irradiating creates the first tracks having areas of thermal profiles exceeding an activation threshold at any instant that do not overlap any areas of thermal profiles of the second tracks exceeding the activation threshold at a same instant.

11. A method as recited in claim 1; further comprising the step of using different multiple source printheads and wherein the one of the printheads used on the first scanning pass is different than the one of the printheads used on the second scanning pass.

12. A thermal printing method, comprising the steps of:
performing a first scanning pass over a donor material with a thermal radiation source, thermally irradiating the donor material using the thermal radiation source and creating spaced apart first tracks in the donor material; and
performing a second scanning pass over the donor material with the thermal radiation source, thermally irradiating the donor material using the thermal radiation source and creating spaced apart second tracks in the donor material wherein the second tracks are in-between the first tracks, the first tracks in the donor material having exposure profiles that do not spatially overlap in the donor material and the donor material between the first tracks being maintained at a temperature below an activation threshold, and the first tracks having a first exposure profile spatially overlapping a second exposure profile of the second tracks, the overlap being produced during the second pass.

13. A thermal printing system, comprising:
a thermal energy source;
a donor material having an activation threshold; and
means for scanning and irradiating the donor material with the thermal energy source creating discontiguous thermal energy tracks in a single pass and creating contiguous tracks in multiple passes.

* * * * *